US012677801B2

(12) United States Patent
DeLuccia et al.

(10) Patent No.: US 12,677,801 B2
(45) Date of Patent: Jul. 14, 2026

(54) ANIMAL TRAINING METHOD, APPARATUS, AND SYSTEM FOR ACHIEVING HEELING BEHAVIOR

(71) Applicant: Hundhaus Designs LLC, Ramsey, NJ (US)

(72) Inventors: Rebecca Longueira DeLuccia, Ramsey, NJ (US); Shawn Robert Stewart, Mahwah, NJ (US)

(73) Assignee: Hundhaus Designs LLC, Ramsey, NJ (US)

( * ) Notice: Subject to any disclaimer, the term of this patent is extended or adjusted under 35 U.S.C. 154(b) by 0 days.

(21) Appl. No.: 18/974,292

(22) Filed: Dec. 9, 2024

(65) Prior Publication Data

US 2025/0098637 A1     Mar. 27, 2025

Related U.S. Application Data

(63) Continuation of application No. 18/244,804, filed on Sep. 11, 2023, now Pat. No. 12,178,190, which is a
(Continued)

(51) Int. Cl.
*A01K 15/02* (2006.01)
*A01K 27/00* (2006.01)

(52) U.S. Cl.
CPC .......... *A01K 15/021* (2013.01); *A01K 27/003* (2013.01); *A01K 27/001* (2013.01)

(58) Field of Classification Search
CPC .. A01K 27/001; A01K 27/002; A01K 27/003; A01K 27/005; A01K 1/06; A01K 15/02; A01K 15/021
See application file for complete search history.

(56) References Cited

U.S. PATENT DOCUMENTS 1,804,377 A     5/1931   Freysinger
4,252,084 A     2/1981   Willow
(Continued)

FOREIGN PATENT DOCUMENTS

CA            2809397 A1 *  9/2014   ............... B68B 1/04
WO     WO-2011002963 A2 *  1/2011   ........... A01K 27/005

OTHER PUBLICATIONS

Homdox Hands Free Dog Training Leash Elastic Dog Leash Reflective Adjustable Waist Belt With Bottle Holder Waist Bags for Running Walking, retrieved on May 26, 2016, URL: http://www.homdox.net/, 7 pages.
(Continued)

*Primary Examiner* — Trinh T Nguyen
(74) *Attorney, Agent, or Firm* — Hard IP Professional Services LLC

(57) ABSTRACT

An animal training system used to train an animal includes a movement controlling device and a wearable device. The movement controlling device includes a first segment and a second segment. The first segment is coupled to a first connecting member. The second segment is coupled to a second connecting member. The wearable device includes a first attachment point and a second attachment point. The first attachment point is located at a midline position of the wearable device. The first segment is configured to detachably couple to the first attachment point via the first connecting member. The second segment is configured to detachably couple to the second attachment point via the second connecting member.

18 Claims, 16 Drawing Sheets

Related U.S. Application Data continuation of application No. 17/529,873, filed on Nov. 18, 2021, now Pat. No. 11,793,166, which is a continuation of application No. 16/108,821, filed on Aug. 22, 2018, now Pat. No. 11,185,051.

(60) Provisional application No. 62/552,442, filed on Aug. 31, 2017.

(56) References Cited

U.S. PATENT DOCUMENTS

| | | | |
|---|---|---|---|
| 5,038,719 | A | 8/1991 | McDonough |
| 5,080,045 | A | 1/1992 | Reese |
| 5,161,486 | A | 11/1992 | Brown |
| D350,628 | S | 9/1994 | Williams |
| 5,718,189 | A | 2/1998 | Blake |
| 5,806,466 | A | 9/1998 | Pintor |
| 5,842,444 | A | 12/1998 | Perrulli |
| D407,866 | S | 4/1999 | Perrulli |
| D408,598 | S | 4/1999 | Martell |
| 5,950,569 | A | 9/1999 | Perrulli |
| 6,029,611 | A | 2/2000 | Hershauer |
| 6,192,835 | B1 | 2/2001 | Calhoun |
| 6,247,428 | B1 | 6/2001 | Mireles |
| 6,450,129 | B1 | 9/2002 | Flynn |
| 6,626,131 | B2 | 9/2003 | Moulton, III |
| 6,851,393 | B2 | 2/2005 | Bremm |
| 6,932,027 | B1 | 8/2005 | Whitney |
| 7,467,604 | B1 | 12/2008 | Werner |
| 7,516,717 | B2 | 4/2009 | David |
| 7,779,789 | B2 | 8/2010 | Tanaya |
| 7,814,866 | B1 | 10/2010 | Gramza |
| 8,079,329 | B1 | 12/2011 | Pujol |
| 8,327,808 | B2 | 12/2012 | Chirico |
| 8,342,137 | B1 | 1/2013 | Burkhardt |
| 8,534,233 | B1 | 9/2013 | Han |
| 8,622,028 | B2 | 1/2014 | Ekstrum |
| 8,919,292 | B1 | 12/2014 | Wang |
| 9,032,911 | B2 | 5/2015 | Hill |
| 10,188,080 | B2 | 1/2019 | Jasmine |

| | | | | |
|---|---|---|---|---|
| 10,477,839 | B2 | 11/2019 | Gonterman | |
| 11,622,539 | B2 * | 4/2023 | Abrams | A01K 27/00 |
| | | | | 119/770 |
| 2004/0194733 | A1 | 10/2004 | Bremm | |
| 2005/0229867 | A1 | 10/2005 | Green | |
| 2006/0180095 | A1 | 8/2006 | Burton | |
| 2007/0012262 | A1 | 1/2007 | Cole | |
| 2007/0261210 | A1 | 11/2007 | Chen | |
| 2010/0095903 | A1 | 4/2010 | Garcia | |
| 2012/0067297 | A1 | 3/2012 | Reyes | |
| 2013/0042818 | A1 | 2/2013 | Capoano | |
| 2013/0042819 | A1 | 2/2013 | Ekstrum | |
| 2017/0142934 | A1 * | 5/2017 | Evans | H02J 50/12 |
| 2018/0116179 | A1 * | 5/2018 | Gonterman | A01K 27/003 |
| 2020/0298034 | A1 * | 9/2020 | Milburn | A41D 13/0007 |

OTHER PUBLICATIONS

Hurtta Hiker Belt, Black, One Size, retrieved on Aug. 4, 2017, URL: https://www.amazon.com/Hurtta-Hiker-Belt-Black-Size/dp/B01AZL5VAM, 9 pages.

Ruffwear—Omnijore Dog-Pulling Gear, retrieved on Aug. 4, 2017, URL: https://www.amazon.com/RUFFWEAR-Omnijore-Joring-Hipbelt-Currant/dp/B011TWZY44/, 10 pages.

Hermes Paris, "Women's Fall-Winter 2021 Runway Show", retrieved on Nov. 18, 2022, URL: https://www.hermes.com/us/en/story/281191-women-fall-winter-fashion-show-21/, 13 pages.

Sarah Mower, Vogue, "Vogue Runway, Hermes Fall 2021 Ready-to-Wear", Mar. 6, 2021, URL: https://www.vogue.com/fashion-shows/fall-2021-ready-to-wear/hermes, 7 pages.

Maya Menon, Vogue, "Here's your Accessories Gift Guide to a Very Hermes Christmas", Dec. 17, 2021, URL: https://vogue.sg/hermes-christmas-gift/, 24 pages.

Bryan Goh, Men's Folio, "The Gift of an Orange Box: Hermes Festive Gifts", Dec. 16, 2021, URL: https://www.mens-folio.com/94920/the-gift-of-an-orange-box-hermes-festive-gifts/, 12 pages.

Hermes Paris, "Heritage Anneaux 45 Belt", retrieved on Nov. 18, 2022, URL: https://www.hermes.com/us/en/product/heritage-anneaux-45-belt-H081742CK89075/, 5 pages.

* cited by examiner

900

1700

1701

1702

1703

1704

1702

1703

1704

1702

1701

1703

1704

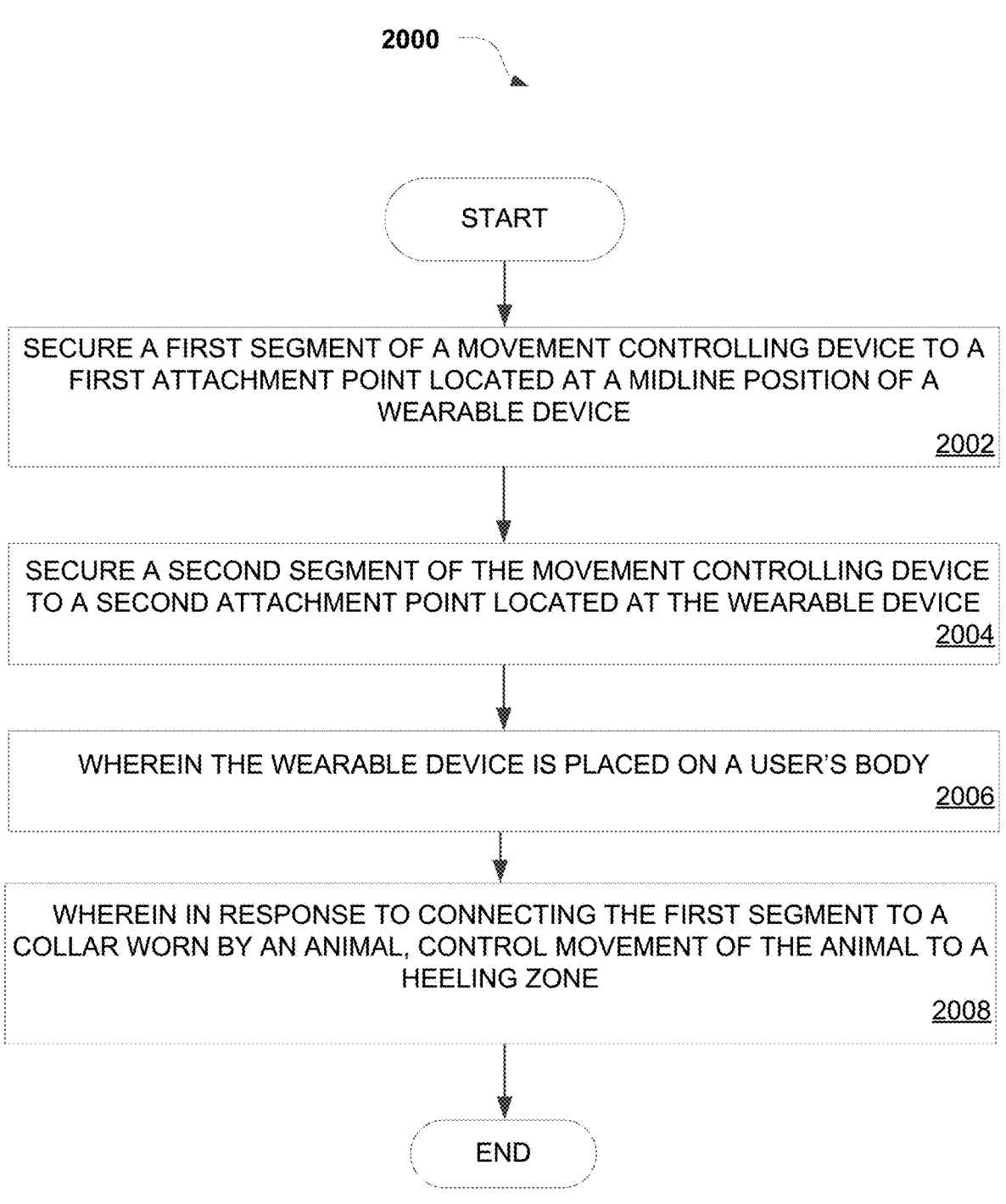

2000

START

SECURE A FIRST SEGMENT OF A MOVEMENT CONTROLLING DEVICE TO A FIRST ATTACHMENT POINT LOCATED AT A MIDLINE POSITION OF A WEARABLE DEVICE

2002

SECURE A SECOND SEGMENT OF THE MOVEMENT CONTROLLING DEVICE TO A SECOND ATTACHMENT POINT LOCATED AT THE WEARABLE DEVICE

2004

WHEREIN THE WEARABLE DEVICE IS PLACED ON A USER'S BODY

2006

WHEREIN IN RESPONSE TO CONNECTING THE FIRST SEGMENT TO A COLLAR WORN BY AN ANIMAL, CONTROL MOVEMENT OF THE ANIMAL TO A HEELING ZONE

2008

END

FIGURE 20

ANIMAL TRAINING METHOD, APPARATUS, AND SYSTEM FOR ACHIEVING HEELING BEHAVIOR

CROSS-REFERENCE TO RELATED APPLICATION

This application is a continuation application and claims priority to U.S. patent application Ser. No. 18/244,804, filed on Sep. 11, 2023, which is a continuation application of U.S. patent application Ser. No. 17/529,873, filed on Nov. 18, 2021 and issued as U.S. Pat. No. 11,793,166 on Oct. 24, 2023, which is a continuation application of U.S. patent application Ser. No. 16/108,821, filed on Aug. 22, 2018, and issued as U.S. Pat. No. 11,185,051 on Nov. 30, 2021, which claims priority to U.S. provisional patent application No. 62/552,442, filed Aug. 31, 2017, the contents of all of which are hereby incorporated by reference in their entirety.

TECHNICAL FIELD

This disclosure generally relates to an animal training method, apparatus, and system for heeling, and more particularly to an animal training method, apparatus, and system for training a dog to achieve heeling behavior within a heeling zone.

BRIEF DESCRIPTION OF THE DRAWINGS

The disclosure may be understood more fully from the detailed description given below and from the accompanying drawings of various implementations of the disclosure. The drawings, however, should not be taken to limit the disclosure to the specific implementations, but are provided for explanation and understanding only.

FIG. 20 is a flowchart of a method of utilizing an animal training system to control movement of an animal, according to an implementation of the disclosure.

DETAILED DESCRIPTION

Figure 1:
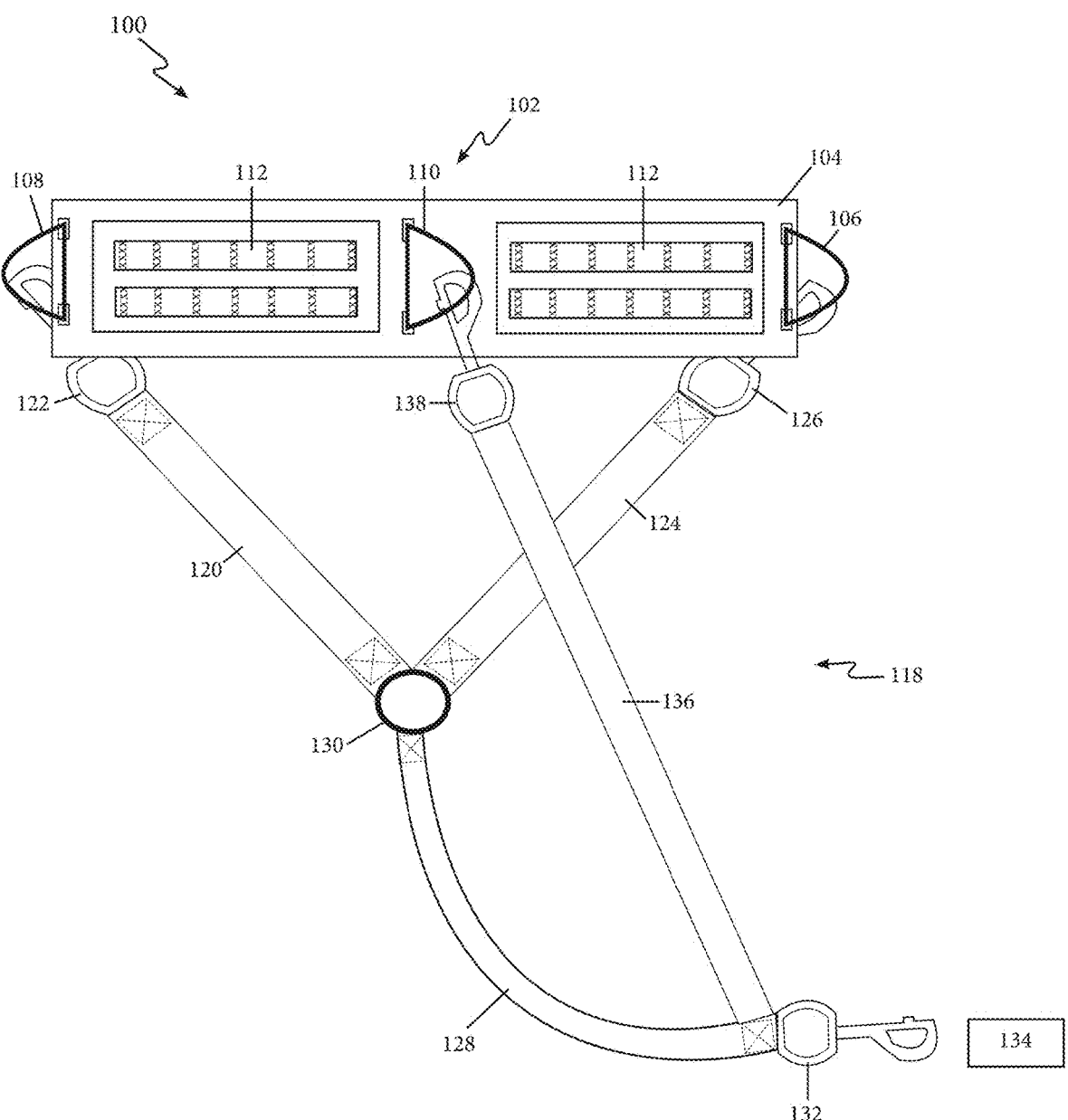
FIG. 1 illustrates a front view of an animal training system, according to an implementation of the disclosure.

Various aspects of the above referenced methods and systems are described in detail herein below by way of examples, rather than by way of limitation.

The terms handler, user, and trainer may be used interchangeably to describe a user of an animal training system that controls an animal.

Typically, pet owners use a leash in combination with a collar or harness to walk their pets. Leashes, collars and harnesses may assist in tethering the animal to a handler but may not control the movement of the animal in close proximity to the user and do not promote training of an animal for achieving heeling behavior without specific methods of use as known to the professional dog training industry. That is, existing products (such as leashes, collar and/or harnesses) do not control the front, lateral and rotational movement of dogs within a controlled area called a "heeling zone."

Traditional waist or walking belts may be used in conjunction with a leash, collar and/or harness to provide a "hands-free" method of attachment between the pet and user. However, such combined mechanisms also do not promote animal training for achieving heeling behavior or controlling the animal to walk, run, or move in close proximity to the user.

Heeling is a behavior learned by a dog to maintain a specific physical location in relationship to a handler. Heeling may utilize both proximity (nearness) and control (unified, parallel movement) by the handler while he/she is in motion (e.g., forward, backward and laterally).

Heeling is not an inherent skill for the dog. Rather, it is a complex behavior that may be difficult to acquire. The behavior may be dependent on the development of "muscle memory" for the heeling zone.

Traditionally, pet owners use a combined leash, collar and/or harness and waist belt to walk a dog hands-free. These options provide several limitations to the user in terms of proximity, control and location that interfere with the dog's learning process and may compromise its ability to build muscle memory for the heeling zone.

In terms of the limitation of proximity, errors may be common. Leashes may function to keep a dog within a boundary defined by its maximum length. Without advanced knowledge in dog training techniques, an ordinary handler may mistakenly allow a dog to routinely reach the end of the leash length, thereby eroding the concept of "nearness" for the dog.

In terms of the limitation of control, skill and knowledge is often required. Leashes, collars and harnesses alone do not offer influence over a dog's behavior. The use of these tools to teach the heeling zone, may be predicated by the handler's skill level and knowledge in dog training techniques on the ways in which leashes, collars and harnesses may be used to achieve heeling behavior. An ordinary handler may generally lack such skill and knowledge and thus default to (and hire) a professional dog trainer for assistance.

Furthermore, location is often incorrect and may pose a limitation. Although a leash, collar or harness can provide leverage against the forward movement of a dog, it does not specifically limit the dog's combined forward, lateral, and rotational movement in a way as to maintain the heeling zone without specific manipulation from the handler.

An added problem is the physical complexity by the ordinary handler to execute a multitude of actions by using his/her hands, while moving with a dog, in order to maintain restraint (as may be required by leash laws), control the dog in the heeling zone, deliver positive reinforcement, and deliver punishment as necessary. Congruent hand actions may include: holding a leash in-hand to maintain restraint; gathering up leash to create correct control and proximity; holding and delivering a food reward and/or operate a clicker for positive reinforcement; holding and operating an electronic-collar (e-collar) remote as a method of punishment if used; and moving the leash as to create collar pressure as a method of punishment if used.

Layering of congruent hand-based actions by the ordinary handler may frequently result in cognitive overload of the handler, diluting his/her ability to execute simultaneous actions with the proper timing and consistency, which may be needed to maximize the dog's learning process.

Thus, what is needed is an animal training system which achieves one or more of the following improvements. An animal training system which restricts movement by the dog to build muscle memory for the heeling zone by limiting combined forward, lateral and rotational movements. An animal training system which provides hip-driven, hands-free operation to increase working cognitive load of the average, non-professional handler so as to improve timing and consistency of rewards and corrections, thereby maximizing the efficiency of a dog's learning process for the desired behavior. An animal training system, which includes an apparatus worn by handler, so as to prepare the dog for achievement of heeling behavior without association to a specific device. Such an apparatus may also prevent the dog from becoming frustrated because the apparatus does not restrict the dog's head or mouth movement, or gaiting. An animal training system that utilizes a teaching system which is designed specifically to help improve the owner's handling skills in addition to aiding the dog's achievement of heeling behavior.

As a user attempting to walk an untrained animal without heeling behavior may find it difficult to control the animal using a traditional leash, collar and/or harness, what is needed is a system, apparatus, and method that not only enables a user to walk a dog in a controlled way but also assists in helping train the dog to achieve heeling behavior while restricting the movement of the dog within the heeling zone.

The present disclosure describes an animal training system which may include a movement controlling device and a wearable device. The movement controlling device includes segments that are connected to attachment points on the wearable device. The segments are connected to attachment points in a manner that control the combined forward, lateral and rotational movements of the animal to a heeling zone and allows a user to walk the animal within the heeling zone without the need to use his/her hands.

FIG. 1 illustrates a front view of an animal training system 100. The animal training system may be used to achieve heeling behavior and for purposes of training the animal to walk, run, move, etc., in a controlled manner.

Animal training system 100 includes a wearable device 102 and a movement controlling device 118. In the depicted implementation, wearable device 102 is a hip belt, and the terms wearable device 102, belt 102, and hip belt 102 may be used interchangeably herein. In other implementations, a wearable device may be a waist belt, a vest, a jacket, body harness, a belt connected to a calf harness, etc.

In an implementation, belt 102 may be a wearable device that is constructed of a durable, all-weather material, leather, PVC, nylon or other materials. Belt 102 may be worn by a user and encircle the user along the hipline.

Belt 102 may include a surface area 104. In an implementation, surface area 104 may be padded to provide comfort to the user wearing belt 102. In an implementation, belt 102 may be of any width and/or length. In one implementation, belt 102 may be between one to six inches in width, and a length of belt 102 may extend across the left and right hips and a front hipline of the user wearing belt 102. In another implementation, the belt may be two inches in width. Surface area 104 includes multiple attachment points.

In the center front of belt 102, a midline attachment point 110 is located approximately at a midline position of belt 102; an outer left hip attachment point 106 is located at a left side of belt 102. A right hip attachment point 108 is located at a right side of belt 102. In the depicted implementation, three attachment points (106, 108, and 110) are shown. However, in other implementations, fewer or more attachment points than depicted may be included.

In an implementation, one or more of the attachment points (106, 108, and/or 110) may be permanently fixed or attached (i.e., sewn/stitched, glued, riveted, etc.) to belt 102. In another implementation, one or more of the attachment points may be removably attached to belt 102. For example, belt 102 may include loop(s) and the attachment point(s) may removably attach to the loop(s).

In an implementation, the attachment points may be constructed of a durable material with a break-strength to withstand the pulling forces of an animal. The attachment points may be constructed out of rubber, metal, fiberglass, leather, or other synthetic or natural materials.

Referring again to midline attachment point 110, in an implementation, a breakaway connection may be included. One end of midline attachment point 110 may be permanently sewn or otherwise affixed to belt 102 while the other end may include a breakaway connection. The breakaway connection may allow midline attachment point 110 to break away from belt 102 upon excursion of a force. The breakaway connection may include a magnet, a hook and loop mechanism, etc., which allows release and reattachment of midline attachment point 110. The breakaway connection may allow a user to safely and quickly disconnect an attached segment (such as front segment 136, described below) in case of an emergency.

In an implementation, rear right segment 120, rear left segment 124, rear center segment 128, and front segment 136 of movement controlling device 118 may be manufactured using a single piece of material and continuously connected (e.g., by being sewn together). In another implementation, any one or more of rear right segment 120, rear left segment 124, rear center segment 128, and front segment 136 may be manufactured using multiple pieces of material (that may be non-continuous) and may be connected together.

In another implementation, midline attachment point 110 may be permanently affixed to belt 102, similar to hip attachment points 106 and 108.

The front of belt 102 may include, in between attachment points, durable material stitched in place as to create slot holders 112 for the addition of modular compartments. Slot holders 112 may allow for modular compartments such as food bags, animal clickers, mobile phone cases, etc. The modular compartments may detachably couple to the slot holders via clips, rings, buckles, a hook and loop mechanism, etc. In other implementations not depicted, belt 102 may additionally include fixed storage compartments such as pockets which may be sewn onto surface area 104. Slot holders 112 and/or fixed storage compartments may be a part of, stitched onto (such as via an overlay), or otherwise affixed to belt 102.

Movement controlling device 118, as depicted, includes four segments: a rear right segment 120, a rear left segment 124, a rear center segment 128, and a front segment 136. In other implementations, movement controlling device may include more or less segments. In one implementation, movement controlling device 118 may include three segments: a rear right segment, a rear left segment, and a single center segment (i.e., where the single center segment would be constructed of a continuous piece of material, e.g., a continuous piece of material that would form a single center segment that would be a combination of rear center segment 128 and front segment 136 depicted in FIG. 1).

Rear right segment 120 includes a connecting member 122 which may connect to right hip attachment point 108 of belt 102. In an implementation, rear right segment 120 may be any length and the length may be adjustable. In another implementation, rear right segment 120 may be of some length that may allow rear right segment 120 to descend from a user's right hip, behind the user along his/her buttocks, until it joins with rear left segment 124.

Rear left segment 124 may be of equal or different length than that of rear right segment 120. In the depicted implementation, lengths of rear left segment 124 and rear right segment 120 are substantially similar. Rear left segment 124, via a connecting member 126, may join to left hip attachment point 106 of hip belt 102 at one end. Rear left segment

124, may descend from the left hip of a user, behind the user along the buttocks, until it joins with rear right segment 120.

Rear center segment 128 may join to rear right segment 120 and rear left segment 124, via a joining member 130. Rear center segment 128 may descend in a downward direction (as depicted) and toward an animal along the backside of a user's legs. Rear center segment 128 may be of a certain length. Rear center segment 128 may include a connecting member 132 at one end. Connecting member 132 may join rear center segment 128 to an animal collar 134. Animal collar 134 may include buckle, prong, choke, etc. to which connecting member 132 attaches. Animal collar 134 may be a neck collar, head collar, body harness, or other collar that may attach to an animal.

Front segment 136 may be permanently affixed or removably attached to rear center segment 128. Front segment 136 and rear center segment 128 connect movement controlling device 118 to animal collar 134, via connecting member 132. Front segment 136 ascends upward (as depicted) and a connecting member 138 may connect with midline attachment point 110. As described above, in one implementation, a continuous piece of material may form a single center segment which is a combination of rear center segment 128 and front segment 136 depicted in FIG. 1. In such an implementation, front segment 136 may be adjustable in length (i.e., adjustable by several inches). In addition, a connecting member attached to the single center segment may not be affixed but instead may be moveable via a slide adjuster. The slide adjuster may allow the connecting member to move anywhere along a length of the front part of the single center segment (i.e., along the length of front segment 136). Thus, the combination of the adjustable length of front segment 136 along with the repositioning of connecting member 132 along any portion of front segment 136 may be used to accommodate varying animal heights and/or user heights. The slide adjuster may be constructed of any material such as metal, plastic, or other durable material. Additional details regarding a single center segment are described herein with respect to FIGS. 18 and 19.

In an implementation, connecting members 122, 126, 132, and/or 138 may be a male or female buckle, snap hook, quick link, eye bolt, swivel hook, bolt snap, d-ring, carabiner clip, etc. In an implementation, joining member 130 may be a d-ring, o-ring, eye swivel, etc. Attachment points 106, 108, and/or 110 may be any shape or size. In an implementation (not depicted), attachment points 106, 108, and/or 110 may be a male or female buckle that may permanently or removably attach to connecting members 122, 138, and/or 126.

Rear right segment 120, rear left segment 124, rear center segment 128, and front segment 136 may vary in length. In an implementation, rear right segment 120, rear left segment 124, rear center segment 128, and/or front segment 136 may be of any length as to allow maintenance of an animal in a heeling zone. In an implementation, rear right segment 120 and rear left segment 124 may be the same or substantially similar in length. For example, the lengths of each of rear right segment 120 and rear left segment 124 may be between 14-16 inches in length. In one example, the combined length of rear center segment 128, and front segment 136 may be between 40-46 inches in length. In an implementation, the lengths of each of rear right segment 120, rear left segment 124, rear center segment 128, and front segment 136 may allow control or restriction of an animal connected thereto via animal collar 134 within a heeling zone. A heeling zone is further described herein with respect to FIG. 5.

In an implementation, rear right segment 120, rear left segment 124, rear center segment 128, and front segment 136 may be sewn together continuously. In another implementation, rear right segment 120, rear left segment 124, rear center segment 128, and front segment 136 may be joined via connecting members (e.g., d-ring, o-ring, quick link, etc.) of durable material to withstand pulling forces of an animal. In an implementation, rear right segment 120, rear left segment 124, rear center segment 128, and front segment 136 may be constructed of any material, including leash material (e.g., leather, nylon, cording, reflective material, polyvinyl chloride (PVC) webbing, etc.).

Figure 2:
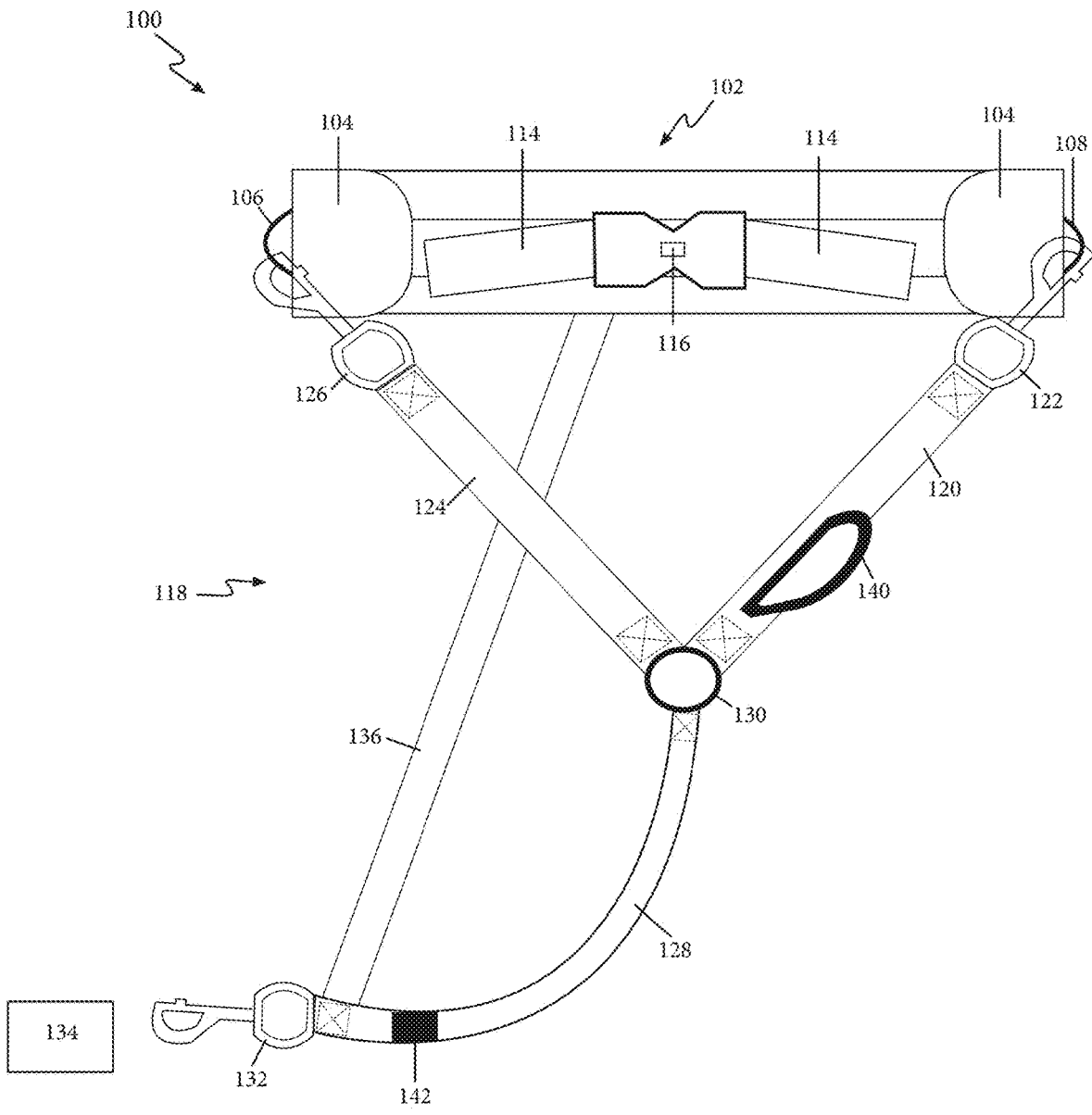
FIG. 2 illustrates a back view of an animal training system, according to an implementation of the disclosure.

FIG. 2 illustrates a back view of an animal training system 100. Animal training system 100 depicted in FIG. 2 includes many of the same features as those depicted in FIG. 1. Therefore, the features described above with respect to FIG. 1 apply to animal training system 100 depicted in FIG. 2.

The back view of belt 102 includes a set of straps 114 for adjusting belt 102 to an appropriate hipline diameter of a user wearing belt 102. Belt 102 also includes a secure closure 116 which may fall on or near the midline of the spine of the user. Secure closure 116 may be a buckle clasp, dual pinch side release buckle, etc. or other closure with male and female ends.

In an optional implementation, a handle 140 may be affixed to a rear right segment 120. In other implementations, one or more handles may be affixed to any of rear right segment 120, rear left segment 124, rear center segment 128, and/or front segment 136.

In the depicted implementation, rear center segment 128 includes shock absorption material or mechanism 142 which may be provided at some point along rear center segment 128. In other implementations, a shock absorption material or mechanism may be included in any part of or the entirety of rear right segment 120, rear left segment 124, rear center segment 128, and front segment 136.

Animal training system 100 in FIGS. 1 and 2 can be worn by a user and connected to an animal to control the animal's movement. FIGS. 3-6 illustrate animal training system 100 in use. As described above, animal training system 100 includes movement controlling device 118 and wearable device 102. Movement controlling device 118 includes front segment 136 (a first segment) and rear right segment 120 (a second segment). Front segment 136 is coupled to connecting member 138 (a first connecting member). Rear right segment 120 is coupled to connecting member 122 (a second connecting member).

Wearable device 102 includes midline attachment point 110 (a first attachment point) and right hip attachment point 108 (a second attachment point). Midline attachment point 110 is located approximately at a midline position of wearable device 102. Front segment 136 is configured to detachably couple to midline attachment point 110 via connecting member 138. Rear right segment 120 is configured to detachably couple to right hip attachment point 108 via connecting member 122. As depicted in FIGS. 1 and 2, rear right segment 120 may be located at an opposing hip position of wearable device 102 in relation to an animal.

In an implementation, movement controlling device 118 further includes rear left segment 124 (a third segment) and rear center segment 128 (a fourth segment). Rear left segment 124, located at the proximal hip position of the wearable device in relation to an animal, includes connecting member 126 (a third connecting member). Rear right segment 120 and rear left segment 124 are connected to rear center segment 128 via joining member 130. Animal collar 134 is connectable to animal training system 100.

In an implementation, wearable device 102 includes rear left segment 124 that is configured to detachably couple to left hip attachment point 106 (a third attachment point) via connecting member 126.

In an implementation, right hip attachment point 108 is located on a right side of wearable device 102 (which may be worn at a user's hip), and left hip attachment point 106 is located on a left side of wearable device 102. Right hip attachment point 108 is located on an opposing side of left hip attachment point 106.

In an implementation, one or more of the connecting members 138, 132, 122, or 126 include one or more of the following: a male or female buckle, snap hook, quick link, eye bolt, swivel hook, bolt snap, or carabiner clip.

In an implementation, wearable device 102 is a hip belt, a waist belt, a vest, a jacket, or other device capable of being worn on a user.

In an implementation, midline attachment point 110 includes a breakaway attachment point.

Movement controlling device 118 includes front segment 136, rear right segment 120, rear left segment 124, and rear center segment 128. Front segment 136 is configured to couple to midline attachment point 110 located at wearable device 102 via connecting member 138. Midline attachment point 110 is located approximately at a midline position of wearable device 102. Rear right segment 120 is configured to couple to right hip attachment point 108 located at wearable device 102 via connecting member 122. Rear left segment 124 is configured to couple to attachment point 106 located at wearable device 102 via connecting member 126. Rear center segment 128 is configured to couple movement controlling device 118 to an animal.

In an implementation, rear center segment 128 is configured to couple movement controlling device 118 to an animal via one or more of a neck collar, a head collar, a harness, or an attachment point on a device that is capable of being worn by the animal.

In an implementation, movement controlling device 118 further includes handle 140 affixed to one of rear right segment 120, rear left segment 124, rear center segment 128, or front segment 136.

One or more of rear right segment 120, rear left segment 124, rear center segment 128, or front segment 136 may include a shock absorption mechanism.

Figure 3:
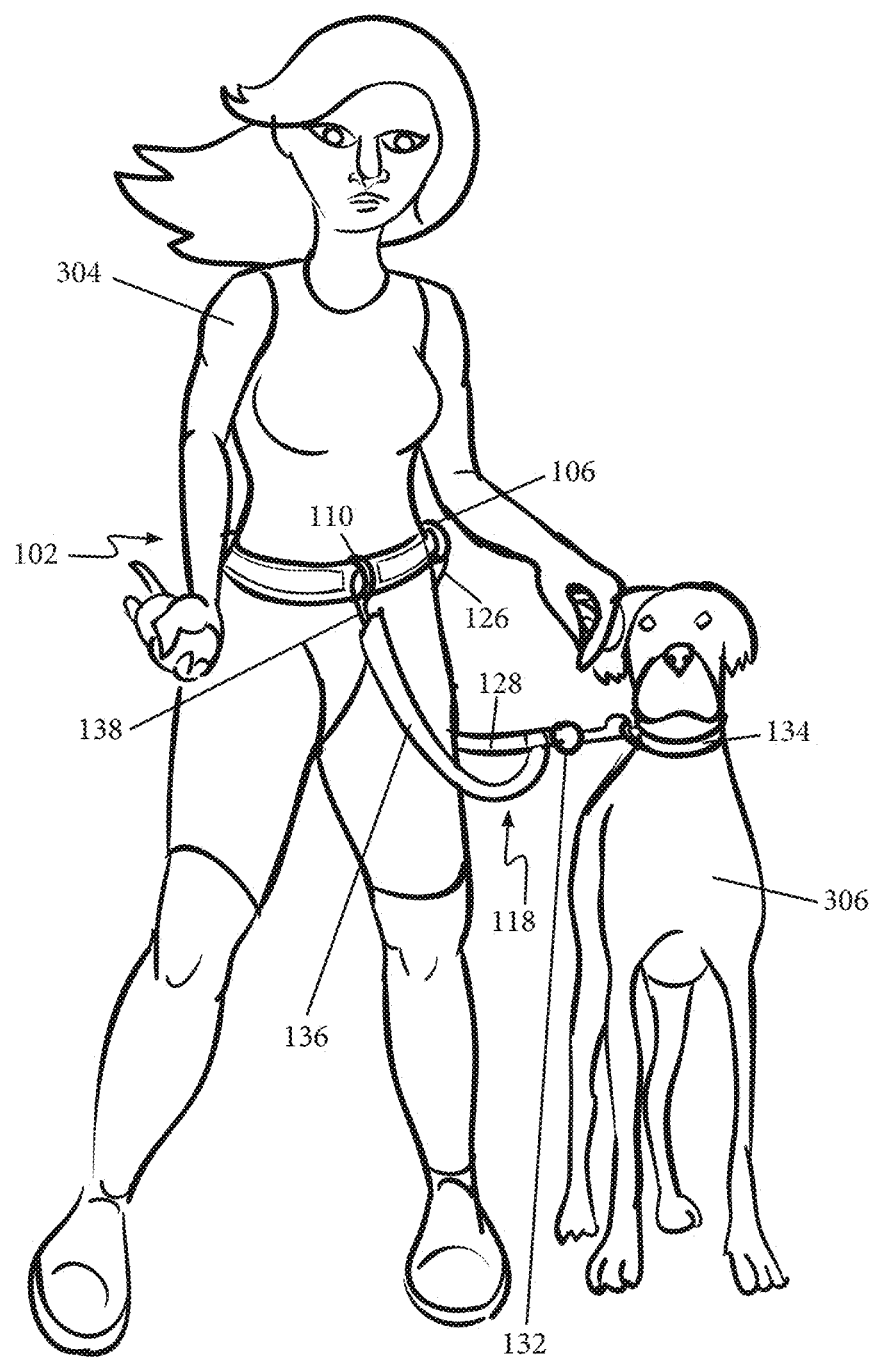
FIG. 3 illustrates a front view of an animal training system worn by a user and connected to an animal, according to an implementation of the disclosure.

FIG. 3 illustrates a front view of an animal training system 100 worn by a user 304 and connected to an animal 306. As depicted, user 304 is able to walk animal 306 (e.g., a dog) without use of her hands. The dog walks/stands/runs adjacent to user 304 and movement of the dog is restricted/controlled via animal training system 100.

Figure 4:
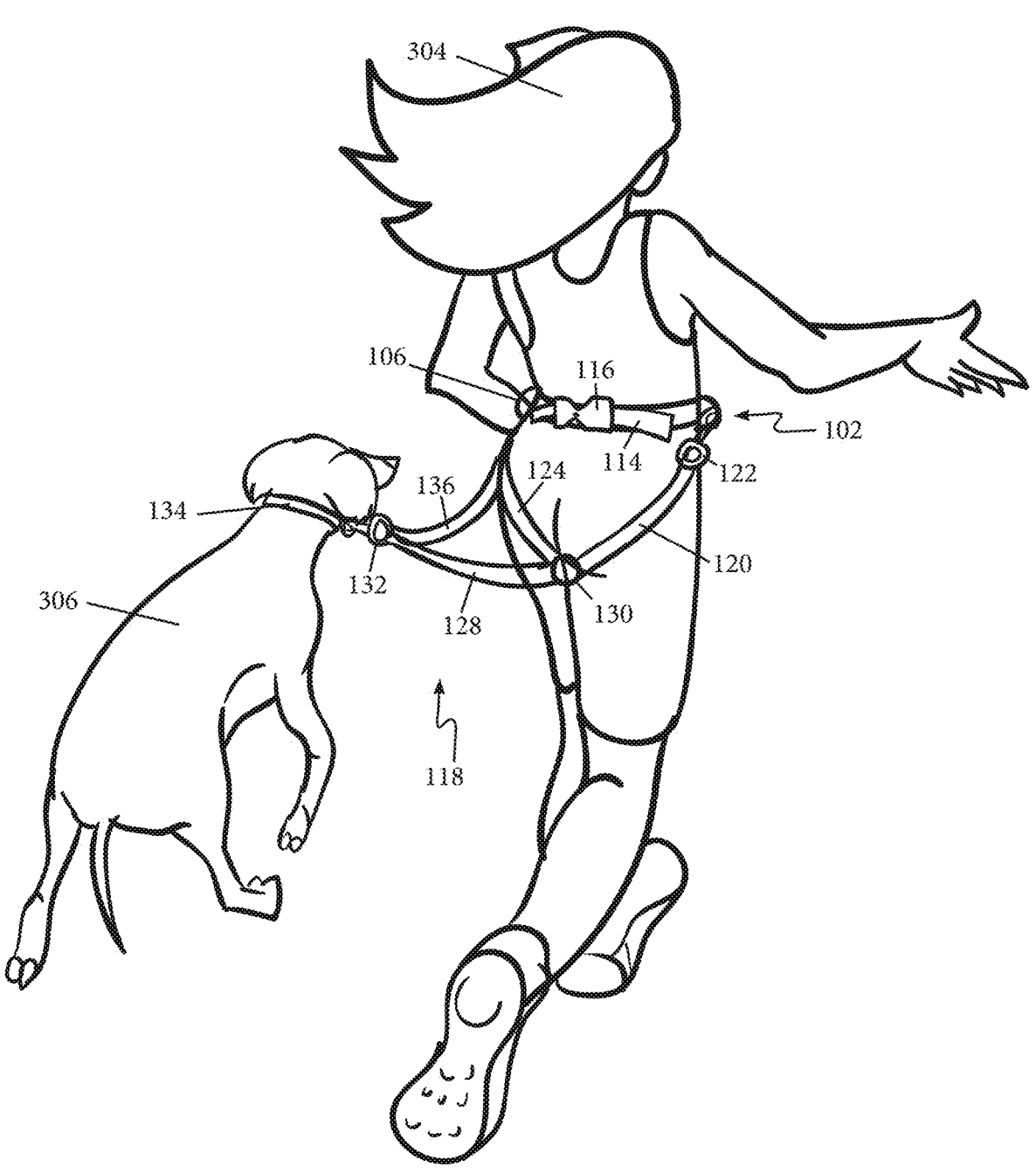
FIG. 4 illustrates a perspective back view of an animal training system worn by a user and connected to an animal, according to an implementation of the disclosure.

FIG. 4 illustrates a perspective back view of an animal training system 100 worn by a user 304 and connected to an animal 306. As depicted, user 304 is able to walk animal 306 (e.g., a dog) without use of her hands while the movement of the dog is controlled within a heeling zone (defined below in FIG. 5, reference no. 502) via animal training system 100.

Although FIG. 5 described herein below references animal training system 100, in other implementations, any animal training system described by this disclosure (e.g., including animal training system 1500 and/or animal training system 1800) may be used to describe an animal training system in FIG. 5 in lieu of or in any combination with each other and/or with animal training system 100.

Figure 5:
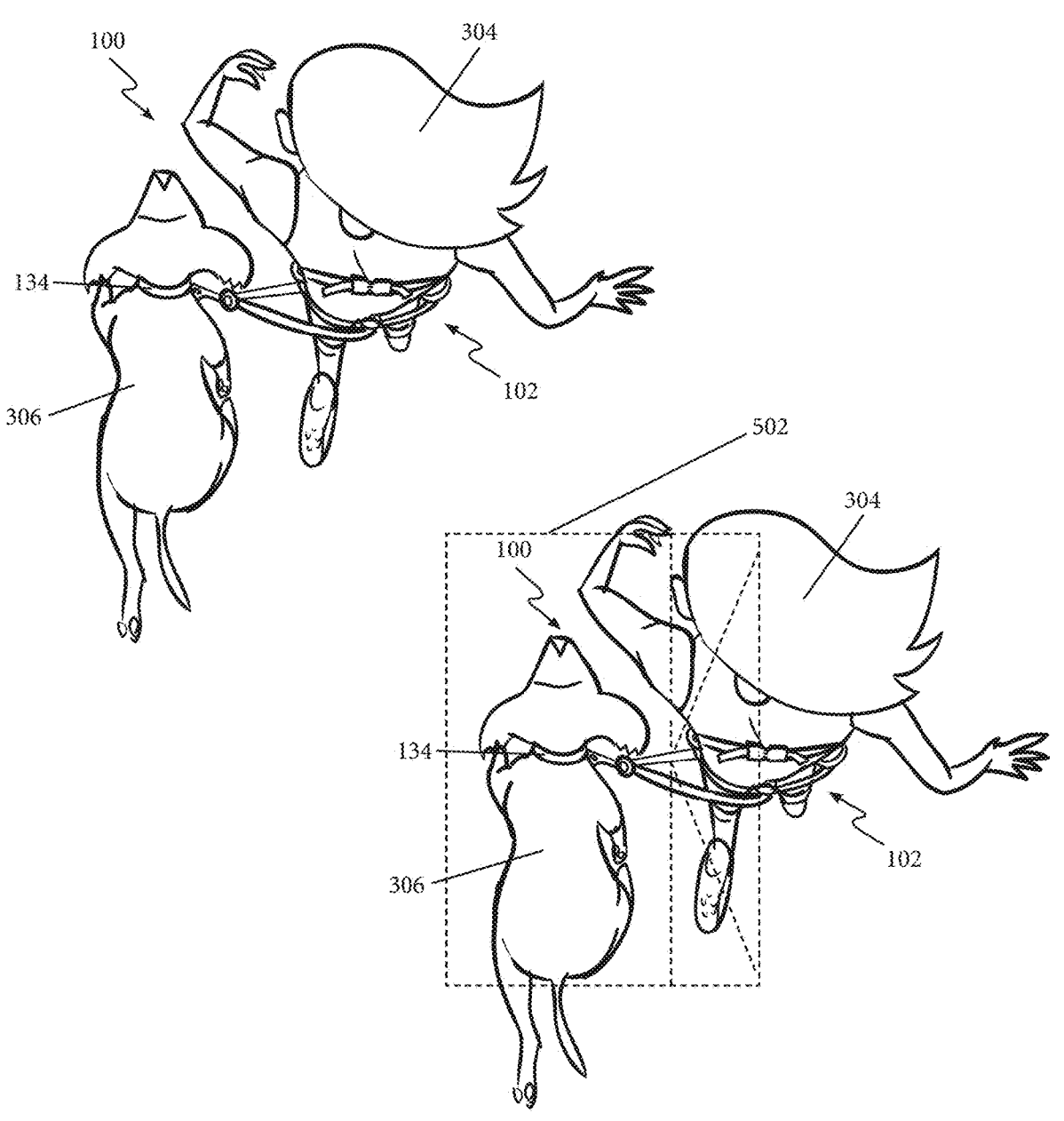
FIG. 5 illustrates a perspective top view of an animal training system worn by a user and connected to an animal, according to an implementation of the disclosure.

FIG. 5 illustrates a perspective top view of an animal training system 100 worn by a user 304 and connected to an animal 306. Animal training system restricts or confines movement of an attached animal within as the area called a heeling zone 502. Heeling zone 502 is depicted as an area within dotted lines in FIG. 5. Heeling zone 502 is an area where the proximal shoulder of an animal coupled to the movement controlling device maintains position within a user's arm's length to the front, side, back and rotational position of the user when wearing the animal training system. When user 304 walks animal 306, the head, neck, or other part of animal 306 that is connected to movement controlling device 118 is constrained to heeling zone 502. Heeling zone 502 is an optimal area to walk the animal and train the animal to follow the lead of the user.

In one example, heeling zone 502 may be any shape and any size. In an implementation, heeling zone 502 may be a circle (having a radius 18-24 inches) where the user's hip or knee being at a center of the circle. An animal's head or proximal shoulder should not extend past the 18-24-inch radius of the heeling zone 502 in front, to the side or behind the user's hip/knee.

Traditional leashes may be four to six feet in length. Therefore, traditional leashes allow a tethered animal to move beyond a heeling zone. The animal thus may have unrestricted freedom of movement to the boundary that the leash provides. Freedom of movement may oppose instructional teachings of a heel, as heel requires restriction to a specific physical location with nearness to the user's hip.

Traditional leashes have not provided a mechanism for replacing hand-held collar corrections with some other means of delivery, resulting in the elimination of properly timed corrections when the animal goes out of the heel position. The animal receives correction when it reaches the end of a traditional leash (e.g., a leash measuring four to six feet). The boundary of a traditional leash is well outside the heeling zone and thus, a traditional leash may not assist in training an animal to heel.

Traditional anti-pull devices may discourage forward movement but are designed to be used with traditional leash restraint, thereby teaching the animal not to pull past the user to the extent that the leash length provides. This may not help achieve heeling behavior. Traditional anti-pull devices also may not address the combination of restricting forward, lateral and rotational movement required for a dog to gain the muscle memory for the heeling zone. Traditional anti-pull devices also may not provide learning benefit to a user in relation to teaching a heel to an animal.

Restricting an animal to a heeling zone provides many advantages. One advantage includes the minimization or elimination of the animal pulling on the movement restriction device. Pulling may not only be nuisance to the user (such as an animal handler) but may cause injury. Pulling may also be one reason why dog owners stop walking their dog.

Another advantage of restricting an animal to a heeling zone is that it promotes attentiveness. For example, an animal such as a dog may be focused on the user rather than the environment, which may help to reduce or eliminate leash reactivity/aggression.

Another advantage of restricting an animal to a heeling zone is that it allows users to safely navigate congested areas, which may be a very important skill for urban dog owners as well as service and police dogs.

Another advantage of restricting an animal to a heeling zone is that it allows dog owners to safely exercise or workout (e.g., run, jog, walk, etc.) with their dogs. Walking or running while an animal is restricted to a heeling zone by using the animal training system allows a user's dog to remain at his/her side and keep pace.

In other implementations, the animal training system may vary and the movement controlling device may convert from one format to another. FIGS. 6-10 described herein illustrate a movement controlling device portion of the animal training system that may convert from a multi-plane, non-linear format to a single-plane, linear format. The following describes how the movement controlling device may be used as a traditional leash or traffic lead when detached from the hip belt.

Figure 6:
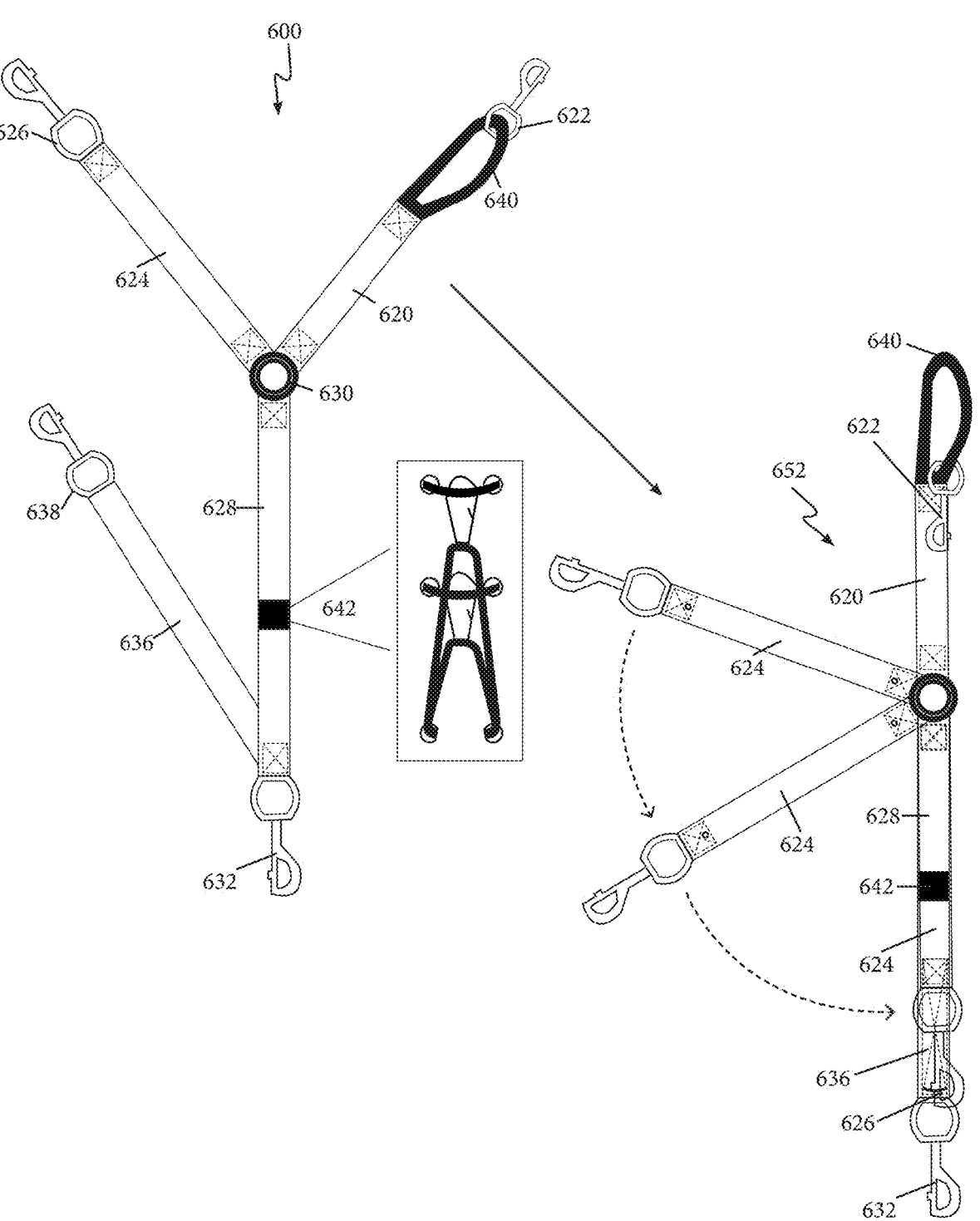
FIG. 6 illustrates a convertible movement controlling device that may convert to a leash line, according to another implementation of the disclosure.

FIG. 6 illustrates a convertible movement controlling device 600 that may convert to a leash line. Convertible movement controlling device 600, as depicted, includes four segments: a rear right segment 620, a rear left segment 624, a rear center segment 628, and a front segment 636.

Rear right segment 620 includes a connecting member 622 which may connect to an attachment point of a wearable device such as a belt (not depicted in FIG. 6).

Rear left segment 624, via a connecting member 626, may join to an attachment point of a wearable device (e.g., a belt). Rear left segment 624, may descend from the left hip of a user, behind the user along the buttocks, until it joins with rear right segment 620.

Rear center segment 628 may join to rear right segment 620 and rear left segment 624, via a connecting member 630. Rear center segment 628 may descend in a downward direction (as depicted) and toward an animal along the backside of a user's legs (when convertible movement controlling device 600 is connected to a belt, etc.). Rear center segment 628 may include a connecting member 632 at one end. Connecting member 632 may join rear center segment 628 to an animal collar.

Rear center segment 628 may include a shock absorber mechanism 642. In one implementation as depicted in the box providing a detailed view of shock absorber mechanism 642, shock absorber mechanism 642 may include a bungee loop with an attached clip (1) and two connecting points: a resting connection point (2) for when shock absorption may not be required and a cinched connection point (3) located above the resting connection for when shock absorption may be required.

Front segment 636 may align on top of rear center segment 628 and may join together via material (e.g., a magnet, a hook and loop mechanism, etc.) as to allow release and reattachment. Further, rear right segment 620, rear left segment 624, and rear center segment 628 may join together via two connecting members (e.g., d-ring, o-ring, eye swivel, etc.) as to allow rear left segment 624 to rotate on top of rear center segment 628 and join together via material (e.g., a magnet, a hook and loop mechanism, etc.) as to allow release and reattachment.

Front segment 636 includes a connecting member 638 that may connect to a wearable device such as a belt.

Rear right segment 620 may remain in an upright position, and includes an optional handle 640 at one end. Handle 640 provides a handgrip to a user. A converted movement controlling device 652 is shown in FIG. 6. Converted movement controlling device 652 is depicted as a traditional linear leash line that may be used to walk an animal independent of a wearable device (i.e., a belt, etc.). Thus, convertible movement controlling device 600 is configured to convert from a single plane, linear device to a multi-plane, non-linear device and convert from the multi-plane non-linear device to the single plane, linear device.

Figure 7:
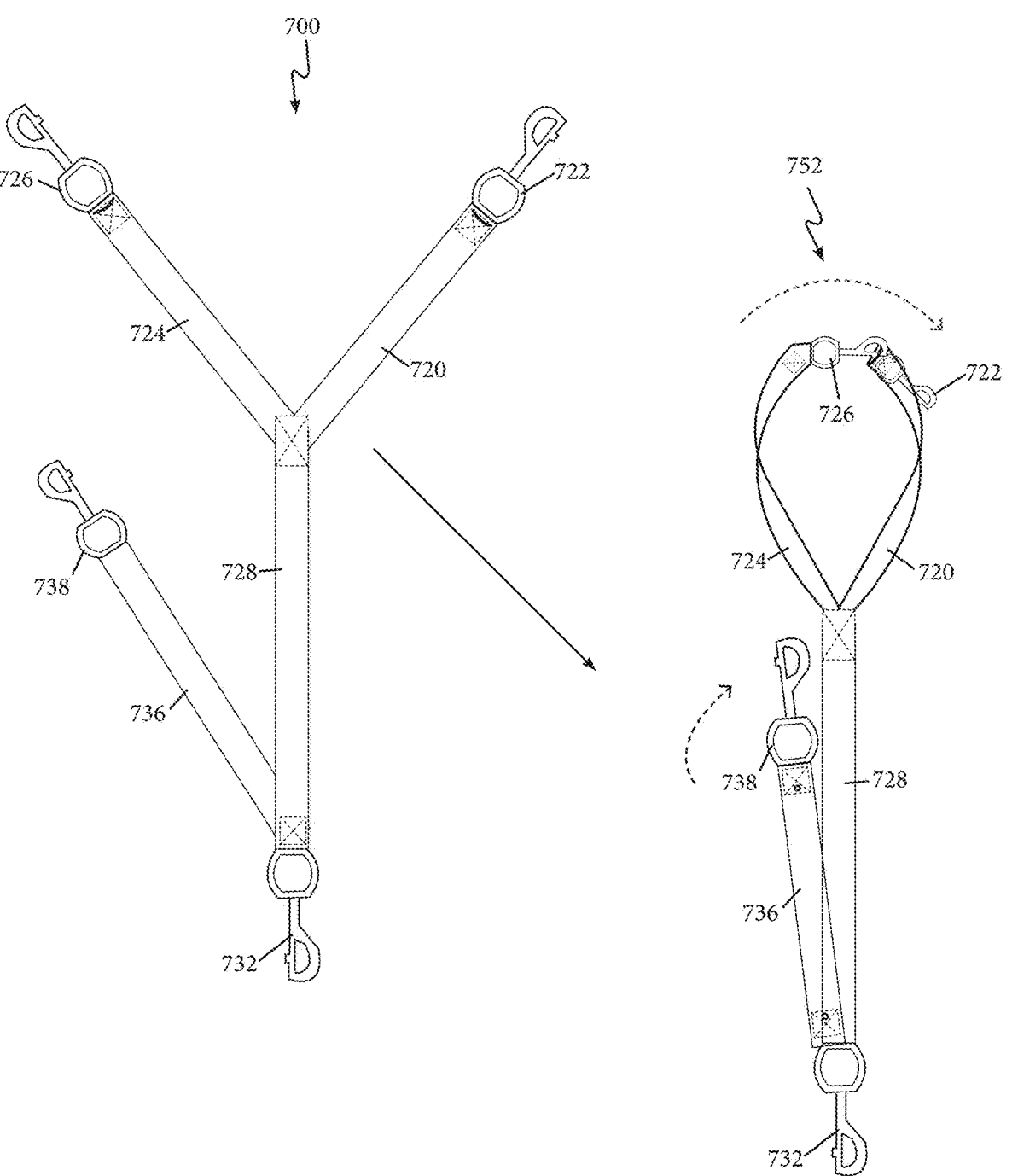
FIG. 7 illustrates a convertible movement controlling device that may convert to a leash line, according to another implementation of the disclosure.

FIG. 7 illustrates a convertible movement controlling device 700 that may convert to a leash line. Convertible movement controlling device 700, as depicted, includes four segments: a rear right segment 720, a rear left segment 724, a rear center segment 728, and a front segment 736.

Rear right segment 720 includes a connecting member 722 which may connect to an attachment point of a wearable device such as a belt (not depicted in FIG. 7).

Rear left segment 724, via a connecting member 726, may join to an attachment point of a wearable device (e.g., a belt). Rear left segment 724, may descend from the left hip of a user, behind the user along the buttocks, until it joins with rear right segment 720.

In the depicted implementation, rear center segment 728 may join rear right segment 720 and rear left segment 724. These segments may be joined together by a permanent connection (e.g., the segments may be sewn together) or via a connecting member (not depicted). Rear center segment 728 may descend in a downward direction (as depicted) and toward an animal along the backside of a user's legs (when convertible movement controlling device 700 is connected to a belt, etc.). Rear center segment 728 may include a connecting member 732 at one end. Connecting member 732 may join rear center segment 728 to an animal collar.

Front segment 736 may align on top of rear center segment 728 and may join together via material (e.g., a magnet, a hook and loop mechanism, etc.) as to allow release and reattachment. Further, rear right segment 720, and rear left segment 724 may join together via connecting members (e.g., male to female buckles, hooks, bolts, quick link, etc.).

Front segment 736 includes a connecting member 738 that may connect to a wearable device such as a belt.

When combined, rear right segment 720 and rear left segment 724 form a handle (as shown in a converted movement controlling device 752 is shown in FIG. 7). Converted movement controlling device 752 may provide a handgrip to a user. Converted movement controlling device 752 is depicted as a traditional linear leash line that may be used to walk an animal independent of a wearable device (i.e., a belt, etc.).

Figure 8:
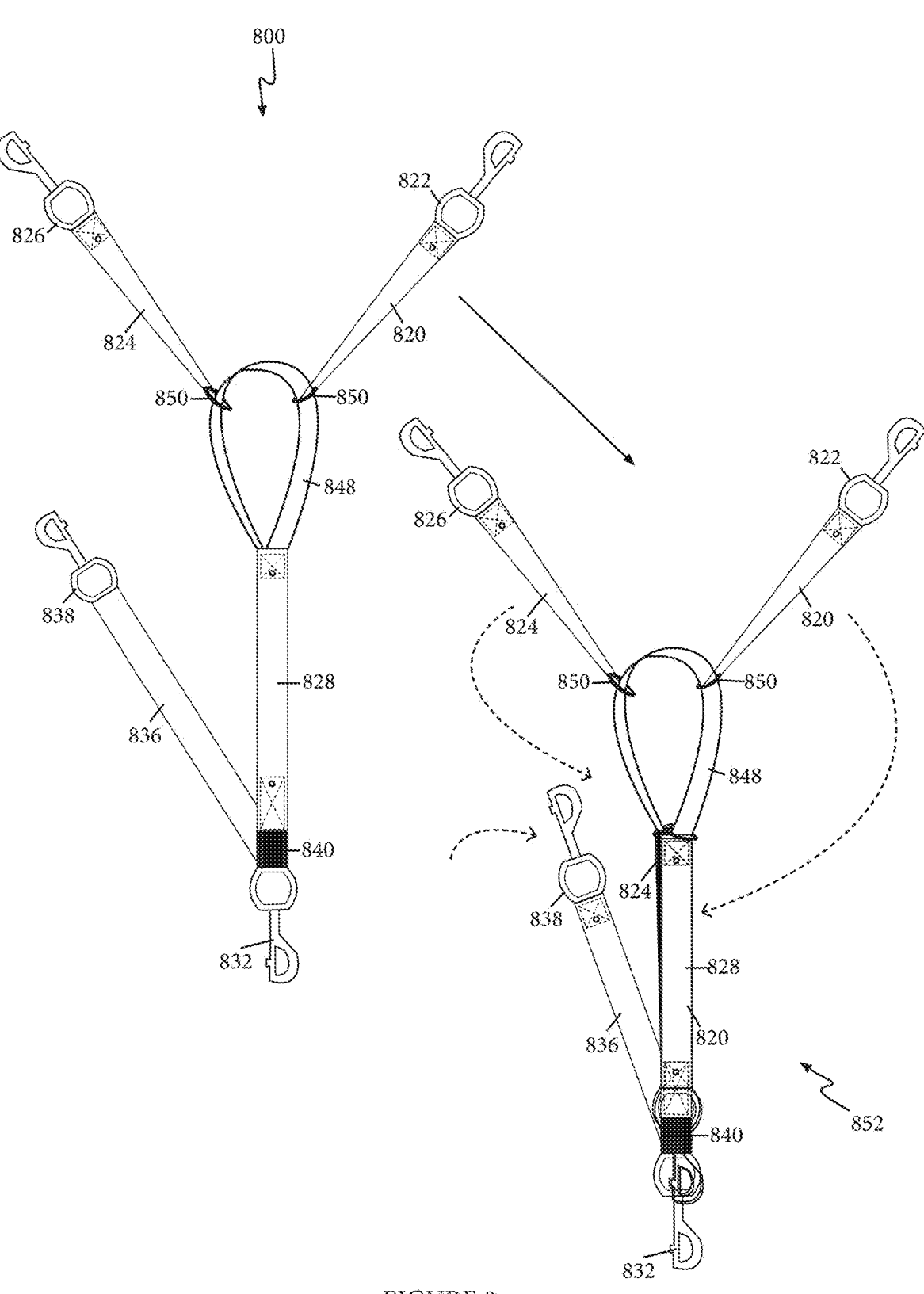
FIG. 8 illustrates a convertible movement controlling device that may convert to a traffic lead, according to another implementation of the disclosure.

FIG. 8 illustrates a convertible movement controlling device 800 that may convert to a traffic lead. Convertible movement controlling device 800, as depicted, includes four segments: a rear right segment 820, a rear left segment 824, a rear center segment 828, and a front segment 836. Convertible movement controlling device 800 also includes a handle 748 located on an upper portion of convertible movement controlling device 800.

Rear right segment 820 includes a connecting member 822 which may connect to an attachment point of a wearable device such as belt (not depicted in FIG. 8).

Rear left segment 824, via a connecting member 826, may join to an attachment point of a wearable device (e.g., a belt). Rear left segment 824, may descend from the left hip of a user, behind the user along the buttocks, until it joins with handle 848 (which is also connected with rear right segment 820).

A length of handle 848 may be of any length. In an implementation, the length measuring from the top of handle 848 to connecting member 832 may be of any length. In an implementation, the length measuring from the top of handle 848 to connecting member 832 may be similar to that of a standard traffic lead (e.g., 12-18 inches).

For conversion from the convertible movement controlling device to a traffic lead, first, front segment 836 may align on top of rear center segment 828 and join together via (e.g., a magnet, a hook and loop mechanism, etc.) as to allow release and reattachment.

Front segment 836 includes a connecting member 838 that may connect to a wearable device such as a belt.

Further, rear right segment 820, and rear left segment 824 which are joined to handle 848 of rear center segment 828, via floating connecting members 850 (e.g., rings, links, etc.) slide down to the base of the handle and align on top of rear center segment 828 where they join together via material (e.g., a magnet, a hook and loop mechanism, etc.) as to allow release and reattachment (as shown in a converted movement controlling device 852 is shown in FIG. 8). Converted movement controlling device 852 is depicted as a traditional linear traffic lead that may be used to walk an animal independent of a wearable device (i.e., a belt, etc.).

Figure 9:
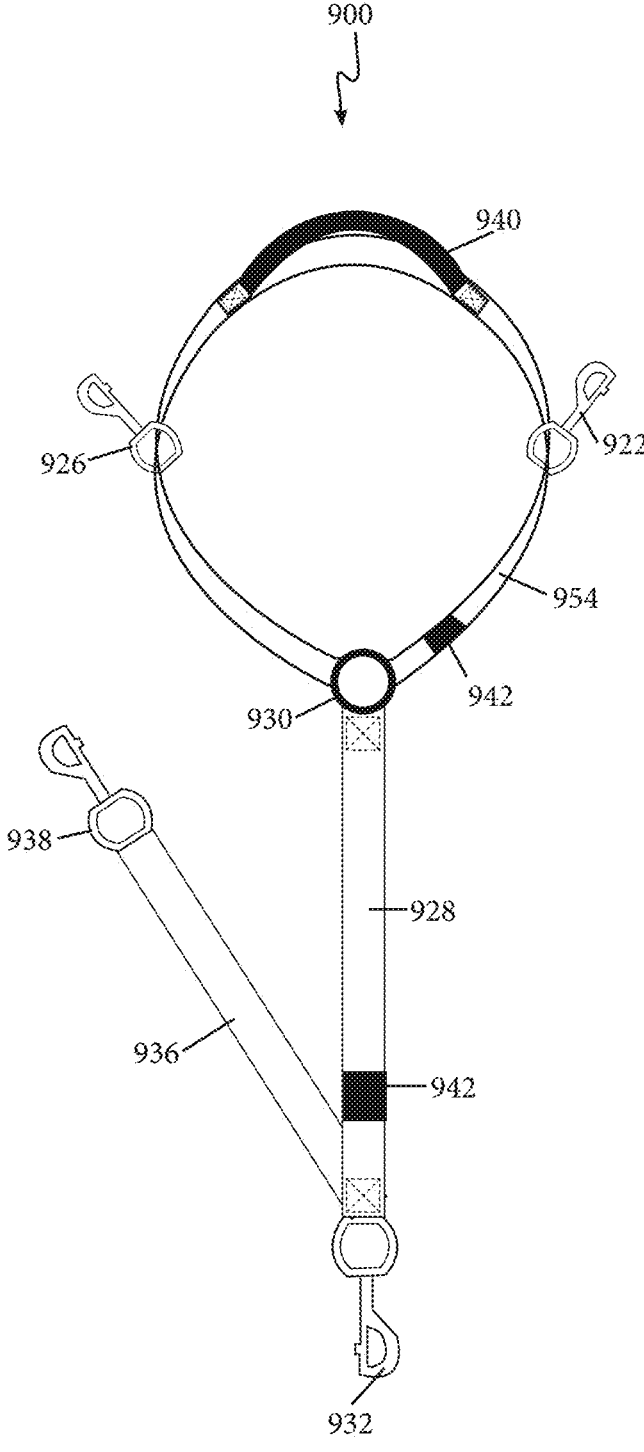
FIG. 9 illustrates a convertible movement controlling device that includes a handle, according to another implementation of the disclosure.

FIG. 9 illustrates a convertible movement controlling device 900 that includes a handle 940. Convertible movement controlling device 900, as depicted, includes a rear center segment 928, and a front segment 936. Rear right segments (120, 620, 720, and 820) and rear left segment (124, 624, 724, and 824) depicted in the implementations of FIGS. 1, and 6-8, are modified to be joined into a continuous circular segment having a diameter. The continuous circular segment is referred to as a rear combined segment 954.

Rear combined segment 954 includes a floating connecting member 922 and a floating connecting member 926 which may each connect to an attachment point of a wearable device such as belt (not depicted in FIG. 9). Rear combined segment 954 also includes a handle 940. Floating connecting member 922, floating connecting member 926, and handle 940 may connect to rear combined segment 954 at some point along its circumference.

For a conversion from the convertible movement controlling device 900 to a traditional linear leash line, front segment 936 may align on top of rear center segment 928 and join together via material (e.g., a magnet, a hook and loop mechanism, etc.) as to allow release and reattachment. Convertible movement controlling device 900 then converts a traditional linear leash line which may be used to walk an animal independent of a wearable device (i.e., a belt, etc.).

Front segment 936 includes a connecting member 938 that may connect to a wearable device such as a belt.

Figure 10:
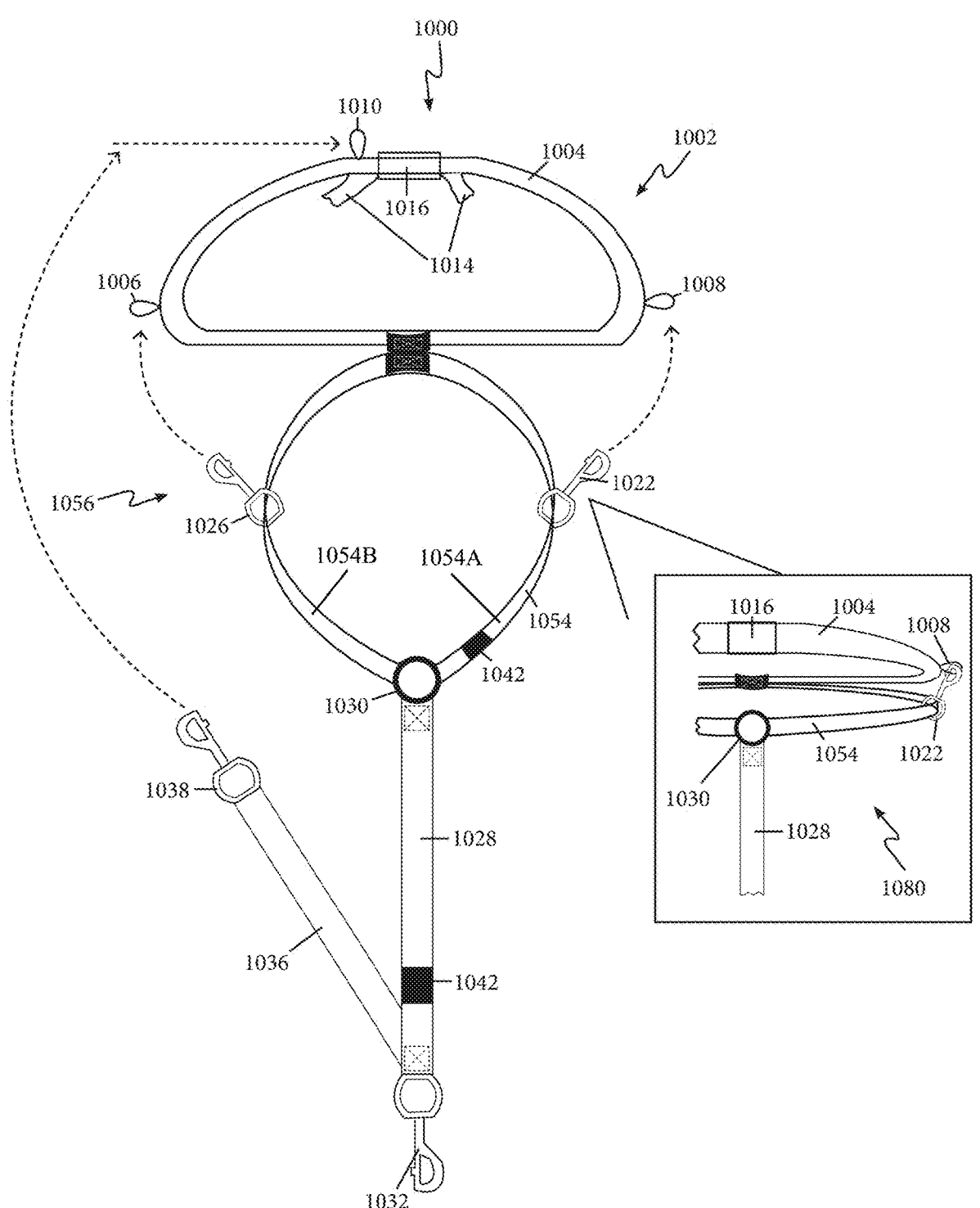
FIG. 10 illustrates a movement controlling device affixed to a wearable device, according to another implementation of the disclosure.

FIG. 10 illustrates a movement controlling device affixed to a wearable device 1000. Movement controlling device 1056 may be permanently attached to belt 1002 at a point that may be aligned with the spine of a user wearing hip belt 1002. Adjusting straps 1014 and closure 1016 may be placed to the front side of belt 1002. A midline attachment point 1010 may either be manufactured to be located on the closure or be located just left (or right, if desired) of closure 1016 at front.

Belt 1002 may include a surface area 1004. In an implementation, surface area 1004 may be padded to provide comfort to the user wearing belt 1002. In an implementation, belt 1002 may be of any width and/or length. In one implementation, belt 1002 may be between one to six inches in width and a length of belt 1002 may extend across the left and right hips and a front hipline of the user wearing belt 1002. In another implementation, the belt may be two inches in width. Surface area 1004 includes multiple attachment points.

In the center front of belt 1002, midline attachment point 1010 is located approximately at a midline position of belt 1002. A left hip attachment point 1006 is located at a left side of belt 1002. A right hip attachment point 1008 is located at a right side of belt 1002. In the depicted implementation, three attachment points (1006, 1008, and 1010) are shown. However, in other implementations, fewer or greater attachment points than depicted may be included.

Movement controlling device 1056, as depicted, includes three segments: a rear combined segment 1054, a rear center segment 1028, and a front segment 1036. Box 1080 depicts details regarding how rear combined segment 1054 may join to attachment point 1008, via connecting member 1022. Rear combined segment 1054 may join to attachment point 1006, via connecting member 1026, in a similar manner. Rear combined segment includes a first segment 1054A and a second segment 1054B.

Rear right segments (120, 620, 720, and 820) and rear left segment (124, 624, 724, and 824) depicted in the implementations of FIGS. 1 and 6-8 are modified to be joined into a continuous circular segment having a diameter. The continuous circular segment is referred to as rear combined segment 1054.

A connecting member 1022 may connect to right hip attachment point 1008 of belt 1002. A connecting member 1026, may join to left hip attachment point 1006 of hip belt 102 at one end.

Rear center segment 1028 may join to rear combined segment 1054, via a connecting member 1030. Rear center segment 1028 may descend in a downward direction (as depicted) and toward an animal along the backside of a user's legs. Rear center segment 1028 may be of a certain length. Rear center segment 1028 may include a connecting member 1032 at one end. Connecting member 1032 may join rear center segment 1028 to an animal collar (not depicted). The animal collar may include buckle, prong, choke, etc. to which connecting member 1032 attaches. The animal collar may be a neck collar, head collar, body harness, or other collar that may attach to an animal.

Front segment 1036 may be permanently affixed or removably attached to rear center segment 1028. Front segment 1036 and rear center segment 1028 connect movement controlling device 1056 to an animal collar, via connecting member 1032. Front segment 1036 ascends upward (as depicted) and a connecting member 1038 may connect with midline attachment point 1010.

In the depicted implementation, rear center segment 1028 and rear combined segment 1054 each include a shock absorption material or mechanism 1042 which may be provided at some point along each respective segment. In other implementations, a shock absorption material or mechanism may be included in any part of or the entirety of rear combined segment 1054, rear center segment 1028, and front segment 1036.

Figure 11:
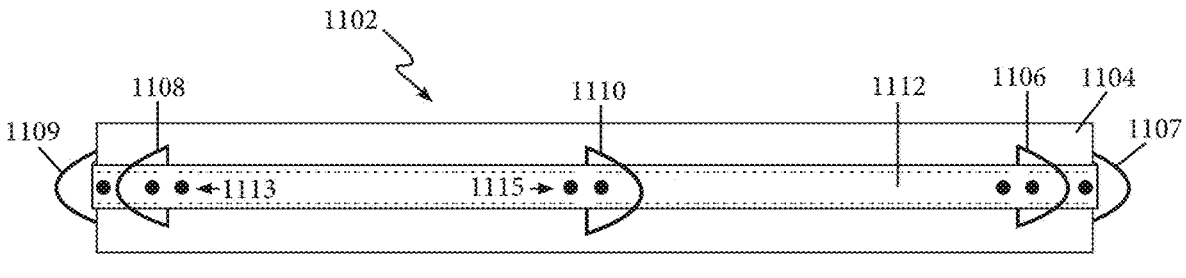
FIG. 11 illustrates a detailed front view of an exemplary wearable device of an animal training system, according to another implementation of the disclosure.
Figures 15, 16:
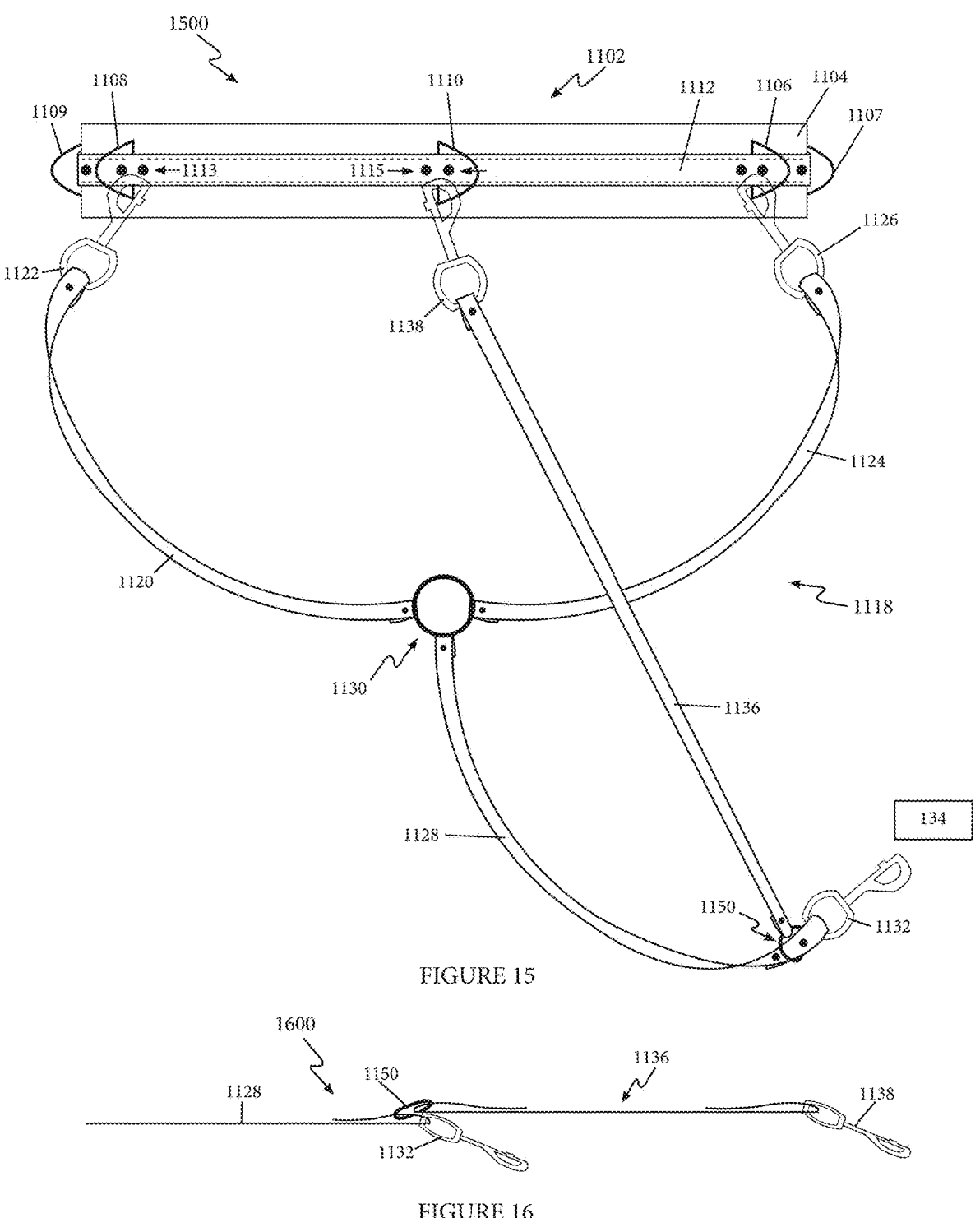
FIG. 15 illustrates a front isometric view of an animal training system, according to another implementation of the disclosure.
FIG. 16 illustrates a portion of a movement controlling device when detached from a wearable device of an animal training system, according to another implementation of the disclosure.

FIG. 11 illustrates a detailed front view of an exemplary wearable device 1102 of an animal training system 1500 (as depicted in FIG. 15 and described herein below). In the depicted implementation, wearable device 1102 is a hip belt, and the terms wearable device 1102, belt 1102, and hip belt 1102 may be used interchangeably herein. In other implementations, a wearable device may be a waist belt, a vest, a jacket, body harness, a belt connected to a calf harness, etc.

In an implementation, belt 1102 may be a wearable device that is constructed of a durable, all-weather material, leather, PVC, nylon or other materials. Belt 1102 may be worn by a user and encircle the user along the hipline.

Belt 1102 may include a surface area 1104. In an implementation, surface area 1104 may be padded to provide comfort to the user wearing belt 1102. In an implementation, belt 1102 may be of any width and/or length. In one implementation, belt 1102 may be between one to six inches in width and a length of belt 1102 may extend across the left and right hips and a front hipline of the user wearing belt 1102. In another implementation, the belt may be two inches in width.

Surface area 1104 includes multiple attachment points. In the depicted implementation, the following five attachment points are shown: a midline attachment point 1110, which is located at approximately a midline position of belt 1102; an outer-left hip attachment point 1107, which is located at an outer left side of belt 1102; an inner-left hip attachment point 1106, which is located at an inner left side of belt 1102; an outer-right hip attachment point 1109, which is located at an outer right side of belt 1102; and an inner-right hip attachment point 1108, which is located at an inner right side of belt 1102. Although five attachments (1106, 1107, 1108, 1109, and 1110) are shown, in other implementations, fewer or more attachment points than depicted may be included.

In an implementation, one or more of the attachment points (1106, 1107, 1108, 1109, and 1110) may be permanently fixed or attached (i.e., sewn/stitched, glued, riveted, etc.) to belt 1102. In another implementation, one or more of the attachment points may be removably attached to belt 1102. For example, belt 1102 may include loop(s) and the attachment point(s) may removably attach to the loop(s).

In an implementation, the attachment points may be constructed of a durable material with a break-strength to withstand the pulling forces of an animal. The attachment points may be constructed out of rubber, metal, fiberglass, leather, or other synthetic or natural materials.

Referring again to midline attachment point 1110, in an implementation, a breakaway connection may be included. One end of midline attachment point 1110 may be permanently sewn or otherwise affixed to belt 1102 while the other end may include a breakaway connection. The breakaway connection may allow midline attachment point 1110 to break away from belt 1102 upon excursion of a force. The breakaway connection may include a magnet, a hook and loop mechanism, etc., which allows release and reattachment of midline attachment point 1110. The breakaway connection may allow a user to safely and quickly disconnect an attached segment (such as front segment 1136, described below in FIG. 15) in case of an emergency.

Belt 1102 may include an overlay 1112 which may be constructed of a durable material. Overlay 1112 may be ¾ of an inch in one implementation or a different width in other implementations. Overlay 1112 may be stitched in place and secured via rivets 1113 to allow connecting members to securely fasten onto attachment points. In one implementation overlay 1112 may be one continuous piece of material. In another implementation, overlay 1112 may be constructed of multiple segments. As depicted, overlay 1112 may be stitched onto (or otherwise affixed to) surface area 1104 of belt 1102. A gap 1115 in between rivets and stitching may be used as a pocket to house or attach accessories (e.g., food bags, animal clickers, mobile phone cases, toys, animal treats, etc.). In another implementation, other patterns of stitching may be used.

Figure 12:
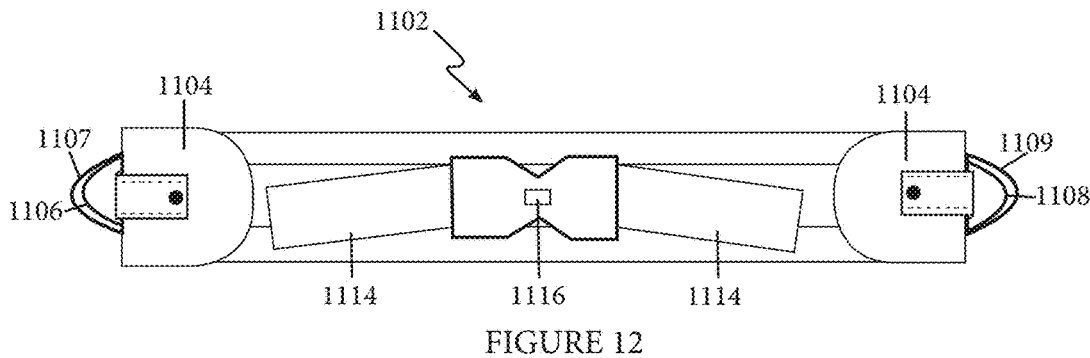
FIG. 12 illustrates a detailed back view of an exemplary wearable device of an animal training system, according to another implementation of the disclosure.

FIG. 12 illustrates a detailed back view of an exemplary wearable device 1102 of animal training system 1500 (as depicted in FIG. 15 and described herein below).

The back view of belt 1102 includes a set of straps 1114 for adjusting belt 1102 to an appropriate hipline diameter of a user wearing belt 1102. Belt 1102 also includes a secure closure 1116 which may fall on or near the midline of the spine of the user. Secure closure 1116 may be a buckle clasp, dual pinch side release buckle, etc. or other closure with male and female ends.

Figure 13:
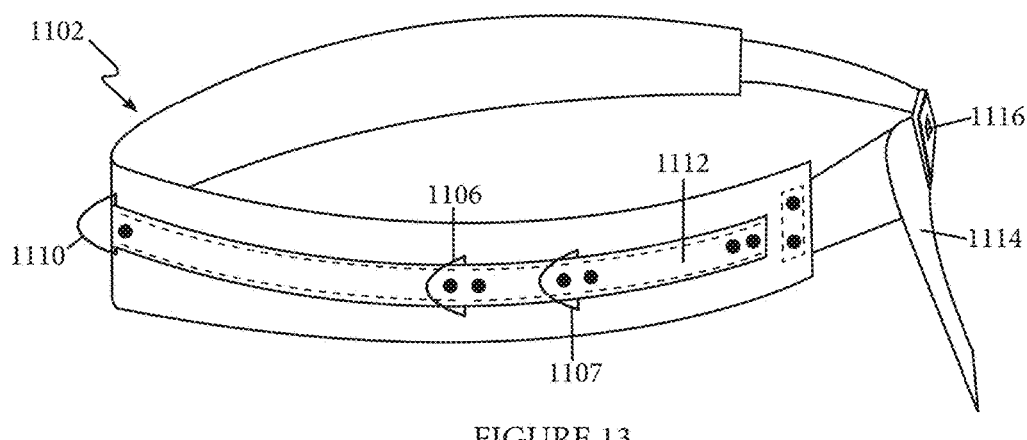
FIG. 13 illustrates an isometric view of an exemplary wearable device of an animal training system, according to another implementation of the disclosure.

FIG. 13 illustrates an isometric view 1300 of an exemplary wearable device 1102 of an animal training system 1500 (as depicted in FIG. 15 and described herein below). A user may place belt 1102 on his/her waist and use secure closure 1116 to snap on or otherwise secure belt 1102 thereto. The user may adjust belt 1102 using straps 1114. Midline attachment point 1110 may be placed approximately mid-waist on the front side of the user's waist and secure closure 1116 may be placed approximately mid-waist on the backside (i.e., rear) of the user's waist.

Figure 14A:
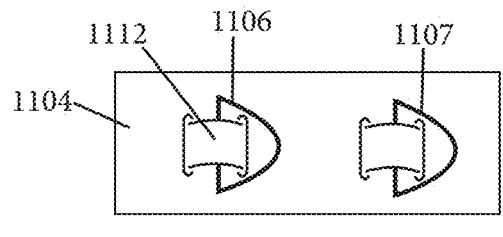
FIG. 14A illustrates a front view of an overlay woven through slots on an exemplary wearable device of an animal training system, according to another implementation of the disclosure.

FIG. 14A illustrates a front view of an overlay 1112 woven through slots on an exemplary wearable device (e.g., 1102) of an animal training system. Specifically, a material is woven through inner-left hip attachment point 1106 and outer-left hip attachment point 1107 of hip belt 1102. In the depicted implementation, overlay 1112 is described in FIGS. 11-13, and 14A-14C. In other implementations (not depicted), another overlay or multiple overlays may be used.

Figure 14B:
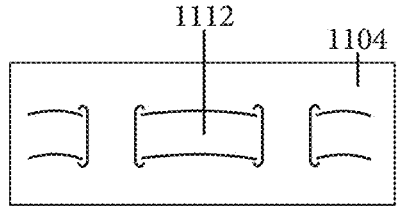
FIG. 14B illustrates a back view of an overlay woven through slots on an exemplary wearable device of an animal training system, according to another implementation of the disclosure.

FIG. 14B illustrates a back view of overlay 1112 woven through slots on an exemplary wearable device (e.g., 1102) of an animal training system. Although a particular woven pattern is depicted, in other implementations, any woven pattern may be used.

Figure 14C:
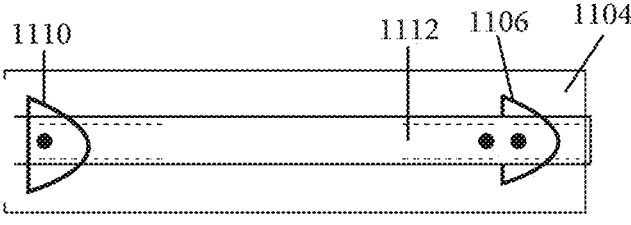
FIG. 14C illustrates a detailed front view of stitching on an overlay, according to another implementation of the disclosure.

FIG. 14C illustrates a detailed front view of stitching on overlay 1112. Overlay 1112, as depicted, contains stitching that is non-consecutive (i.e., contains a gap) which may allow for attachment of various accessory items (e.g., treat bag, keys, clicker, etc.). In other implementations, the stitching may contain multiple gaps, or other patterns of stitching may be used.

FIG. 15 illustrates a front isometric view of animal training system 1500. Animal training system 1500 includes wearable device 1102 (described in detail above with respect to FIGS. 11 and 12) and a movement controlling device 1118. Movement controlling device 1118, as depicted, includes four segments: a rear right segment 1120, a rear left segment 1124, a rear center segment 1128, and a front segment 1136.

As depicted, rear right segment 1120 includes a connecting member 1122 which may connect to inner-right hip attachment point 1108 of belt 1102. In another implementation (not depicted) connecting member 1122 may connect to outer-right hip attachment point 1109 of belt 1102. The user may choose an appropriate attachment point to secure movement controlling device 1118 based on the size of the animal, the comfort of the user (i.e., based on the user's waist size), or other reasons.

In an implementation, rear right segment 1120 may be any length and the length may be adjustable. In another implementation, rear right segment 1120 may be of some length that may allow rear right segment 1120 to descend from a user's right hip, behind the user along his/her buttocks, until it joins with rear left segment 1124.

Rear left segment 1124 may be of equal or different length than that of rear right segment 1120. In the depicted implementation, lengths of rear left segment 1124 and rear right segment 1120 are substantially similar. Rear left segment 1124, via a connecting member 1126, may join to inner-left hip attachment point 1106 of hip belt 1102 at one end. In another implementation (not depicted) connecting member 1126 may connect to outer-left hip attachment point 1107 of belt 1102. The user may choose an appropriate attachment point to secure movement controlling device 1118 based on the size of the animal, the comfort of the user (i.e., based on the user's waist size), or other reasons.

Rear left segment 1124, may descend from the left hip of a user, behind the user along the buttocks, until it joins with rear right segment 1120.

Rear center segment 1128 may join to rear right segment 1120 and rear left segment 1124, via a joining member 1130. Rear center segment 1128 may descend in a downward direction (as depicted) and toward an animal along the backside of a user's legs. Rear center segment 1128 may be of a certain length. Rear center segment 1128 may include a connecting member 1132 at one end. Connecting member 1132 may join rear center segment 1128 to an animal collar 134. Animal collar 134 may include buckle, prong, choke, etc. to which connecting member 132 attaches. Animal collar 134 may be a neck collar, head collar, body harness, or other collar that may attach to an animal.

Front segment 1136 may be permanently affixed or removably attached to rear center segment 1128. In the depicted implementation, front segment 1136 and rear center segment 1128 connect together via a connection 1150 (e.g., d-ring, o-ring, eye swivel, etc.) which allow segments 1128 and 1136 to form one linear line when front connecting member 1138 is detached from attachment point 1110. Front segment 1136 and rear center segment 1128 connect movement controlling device 1118 to animal collar 134, via connecting member 1132. Front segment 1136 ascends upward (as depicted) and a connecting member 1138 may connect with midline attachment point 1110.

In an implementation, connecting members 1122, 1126, 1132, and/or 1138 may be a male or female buckle, snap hook, quick link, eye bolt, swivel hook, bolt snap, d-ring, carabiner clip, etc. In an implementation, joining member 1130 may be a d-ring, o-ring, eye swivel, etc. Attachment points 1106, 1107, 1108, 1109, and/or 1110 may be any shape or size. In an implementation (not depicted), attachment points 1106, 1107, 1108, 1109, and/or 1110 may be a male or female buckle that may permanently or removably attach to connecting members 1122, 1138, and/or 1126. In an implementation, a connecting member may attach as close as possible to an attachment point, reducing slack in a corresponding segment.

Rear right segment 1120, rear left segment 1124, rear center segment 1128, and front segment 1136 may vary in length. In an implementation, the lengths of each of rear right segment 1120, rear left segment 1124, rear center segment 1128, and front segment 1136 may allow control or restriction of an animal connected thereto via animal collar 134 within a heeling zone (as described above with respect to FIG. 5).

In an implementation, rear right segment 1120, rear left segment 1124, rear center segment 1128, and front segment 1136 may be sewn together continuously. In another implementation, rear right segment 1120, rear left segment 1124, rear center segment 1128, and front segment 1136 may be joined via connecting members (e.g., d-ring, o-ring, quick link, etc.) of durable material to withstand pulling forces of an animal. In an implementation, rear right segment 1120, rear left segment 1124, rear center segment 1128, and front segment 1136 may be constructed of any material, including leash material (e.g., leather, nylon, cording, reflective material, polyvinyl chloride (PVC) webbing, etc.).

In an implementation, rear right segment 1120, rear left segment 1124, rear center segment 1128, and front segment 1136 of movement controlling device 1118 may be manufactured using a single piece of material and continuously connected (e.g., by being sewn together).

In another implementation, midline attachment point 1110 may be permanently affixed to belt 1102, similar to hip attachment points 1106, 1107, 1108, and 1109.

As described above, animal training system 1500 includes movement controlling device 1118 and wearable device 1102. Movement controlling device 1118 includes front segment 1136 (a first segment) and rear right segment 1120 (a second segment). Front segment 1136 is coupled to connecting member 1138 (a first connecting member). Rear right segment 1120 is coupled to connecting member 1122 (a second connecting member).

Wearable device 1102 includes midline attachment point 1110 (a first attachment point) and inner-right hip attachment point 1108 (a second attachment point), as depicted. Midline attachment point 1110 is located approximately at a midline position of wearable device 1102. Front segment 1136 is configured to detachably couple to midline attachment point 1110 via connecting member 1138. In an implementation, front segment 1136 may couple snuggly (i.e., as close as possible) via connecting member 1138 to midline attachment point 1110. Rear right segment 1120 is configured to detachably couple to inner-right hip attachment point 1108 via connecting member 1122. Similar to the depictions in FIGS. 1 and 2, rear right segment 1120 in FIG. 15 may be located at an opposing hip position of wearable device 1102 in relation to an animal.

In other implementations not depicted, rear right segment 1120 is configured to detachably couple to outer-right hip attachment point 1109 via connecting member 1122.

In an implementation, movement controlling device 1118 further includes rear left segment 1124 (a third segment) and rear center segment 1128 (a fourth segment). Rear left segment 1124, located at the proximal hip position of the wearable device in relation to an animal, includes connecting member 1126 (a third connecting member). Rear right segment 1120 and rear left segment 1124 are connected to rear center segment 1128 via joining member 1130. Animal collar 134 is connectable to animal training system 1500.

In the depicted implementation, wearable device 1102 includes rear left segment 1124 that is configured to detachably couple to inner-left hip attachment point 1106 (a third attachment point) via connecting member 1126.

In other implementations not depicted, rear left segment 1124 is configured to detachably couple to outer-left hip attachment point 1107 via connecting member 1126.

In an implementation, inner-right hip attachment point 1108 and outer-right hip attachment point 1109 and are located on a right side of wearable device 102 (which may be worn at a user's hip), and inner-left hip attachment point 1106 and outer-left hip attachment point 1107 are located on a left side of wearable device 1102. Inner-right hip attachment point 1108 and outer-right hip attachment point 1109 and are located on opposing sides of inner-left hip attachment point 1106 and outer-left hip attachment point 1107.

In an implementation, one or more of the connecting members 1138, 1132, 1122, or 1126 include one or more of the following: a male or female buckle, snap hook, quick link, eye bolt, swivel hook, bolt snap, or carabiner clip.

In an implementation, wearable device 1102 is a hip belt, a waist belt, a vest, a jacket, or other device capable of being worn on a user.

In an implementation, midline attachment point 1110 includes a breakaway attachment point.

Movement controlling device 1118 includes front segment 1136, rear right segment 1120, rear left segment 1124, and rear center segment 1128. Front segment 1136 is configured to couple to midline attachment point 1110 located at wearable device 1102 via connecting member 1138. Midline attachment point 1110 is located approximately at a midline position of wearable device 1102. Rear right segment 1120 is configured to couple to inner-right hip attachment point 1108 and outer-right hip attachment point 1109 located at wearable device 1102 via connecting member 1122. Rear left segment 1124 is configured to couple to inner-left hip attachment point 1106 and outer-left hip attachment point 1107 located at wearable device 1102 via connecting member 1126. Rear center segment 1128 is configured to couple movement controlling device 1118 to an animal.

In an implementation, rear center segment 1128 is configured to couple movement controlling device 1118 to an animal via one or more of a neck collar, a head collar, a harness, or an attachment point on a device that is capable of being worn by the animal.

In an implementation, movement controlling device 1118 may further include a handle affixed to one of rear right segment 1120, rear left segment 1124, rear center segment 1128, or front segment 1136.

One or more of rear right segment 1120, rear left segment 1124, rear center segment 1128, or front segment 1136 may include a shock absorption mechanism.

In some implementations, a shock absorption material or mechanism may be included in any part of or the entirety of rear center segment 1128, rear right segment 1120, rear left segment 1124, and/or front segment 1136.

FIG. 16 illustrates a portion 1600 of movement controlling device 1118 when detached from wearable device 1102 of animal training system 1500 (wearable device 1102 and animal training system 1500 are depicted in FIGS. 11, 12, 13, and 15). Rear center segment 1128 and front segment 1136 are depicted as extended to a straight leash line when connecting member 1138 is disengaged from belt 1102.

Figure 17:
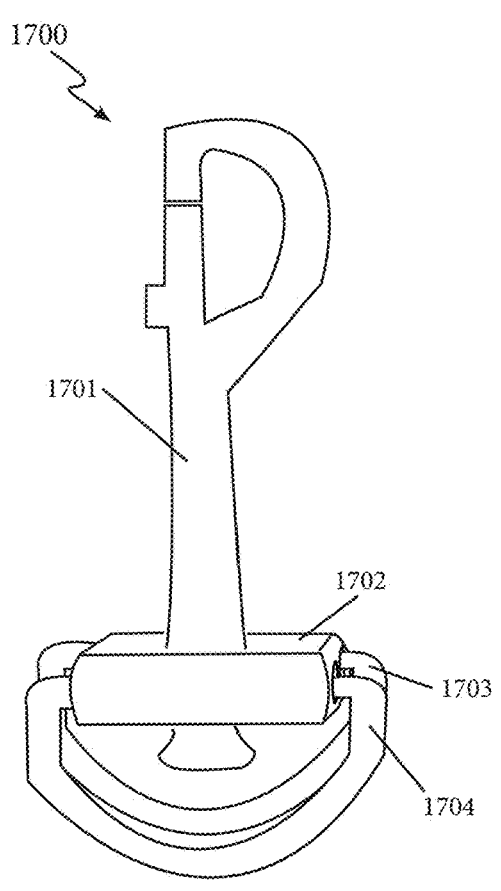
FIG. 17 illustrates various views of an exemplary connecting member that is a double d-ring snap hook, according to an implementation of the disclosure.
Figure 17:
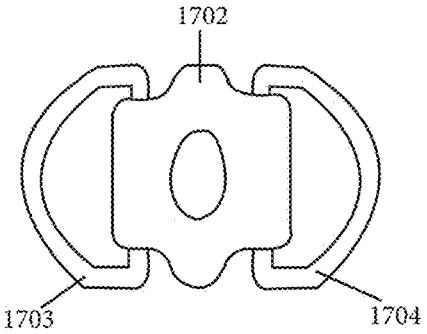
Figure 17:
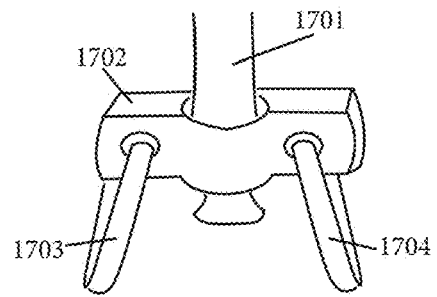

FIG. 17 illustrates various views of an exemplary connecting member that is a double d-ring snap hook 1700. Specifically, the top depicts an isometric view of double d-ring snap hook 1700, the bottom left depicts a top view of double d-ring snap hook 1700, and the bottom right depicts a side view of double d-ring snap hook 1700. Double d-ring snap hook 1700 includes a main body or hook member 1701, a swivel member 1702, and two d-ring members 1703 and 1704, which are each affixed to swivel member 1702. In an implementation, each d-ring member 1703 and 1704 may be affixed to swivel member 1702 in a manner which allows them to rotate 180° from the top to the bottom. In the depicted implementation, the two d-ring members 1703 and 1706 are not fixed to one another. Any one or more connecting members described herein and depicted in the figures may be double d-ring snap hook 1700.

Figures 18, 19:
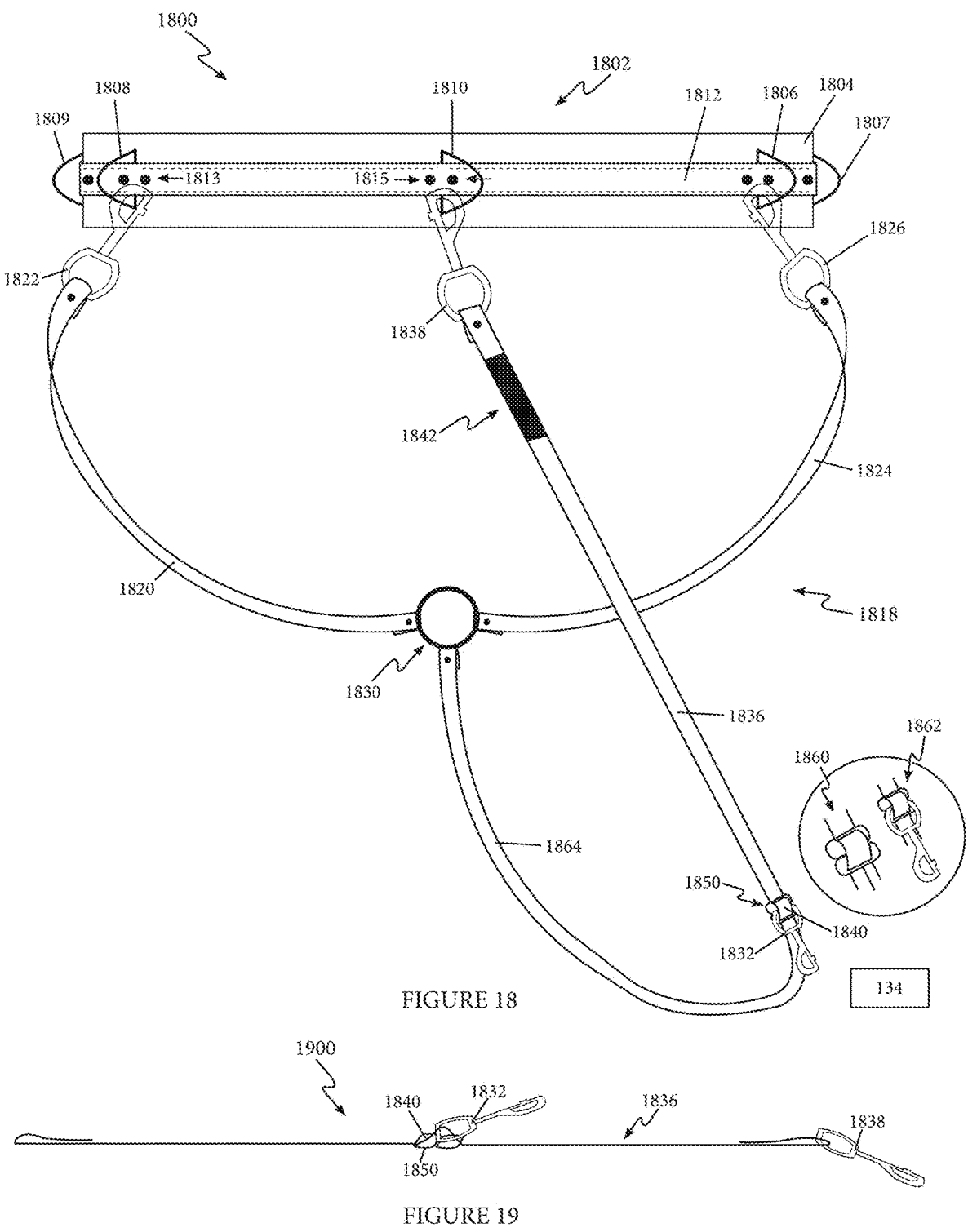
FIG. 18 illustrates a front isometric view of an animal training system with a movement controlling device having an adjustable length segment, according to an implementation of the disclosure.
FIG. 19 illustrates a portion of a movement controlling device, having an adjustable length segment, when detached from an animal training system, according to another implementation of the disclosure.

FIG. 18 illustrates a front isometric view of an animal training system 1800 with a movement controlling device 1818 having an adjustable length segment 1850. Portions of animal training system 1800 are similar to animal training system 100, and/or animal training system 1500. Therefore, animal training systems 100, 1500, and 1800 may include some similar features which may be interchangeable within any of animal training systems 100, 1500, and 1800. Some of the features described herein below with respect to animal training system 1800 are not described in detail as they are substantially similar to features described above with respect to animal training systems 100 and 1500.

Animal training system 1800 includes wearable device 1802, which is a hip belt, and the terms wearable device 1802, belt 1802, and hip belt 1802 may be used interchangeably herein. In other implementations, a wearable device may be a waist belt, a vest, a jacket, body harness, a belt connected to a calf harness, etc.

In an implementation, belt 1802 may be a wearable device that is constructed of a durable, all-weather material, leather, PVC, nylon or other materials. Belt 1802 may be worn by a user and encircle the user along the hipline.

Belt 1802 may include a surface area 1804 which includes multiple attachment points. In the depicted implementation, the following five attachment points are shown: a midline attachment point 1810, which is located at approximately a midline position of belt 1802; an outer-left hip attachment point 1807, which is located at an outer left side of belt 1802; an inner-left hip attachment point 1806, which is located at an inner left side of belt 1802; an outer-right hip attachment point 1809, which is located at an outer right side of belt 1802; and an inner-right hip attachment point 1808, which is located at an inner right side of belt 1802. Although five attachments (1806, 1807, 1808, 1809, and 1810) are shown, in other implementations, fewer or more attachment points than depicted may be included.

In an implementation, one or more of the attachment points (1806, 1807, 1808, 1809, and 1810) may be permanently fixed or attached (i.e., sewn/stitched, glued, riveted, etc.) to belt 1802. In another implementation, one or more of the attachment points may be removably attached to belt 1802. For example, belt 1802 may include loop(s) and the attachment point(s) may removably attach to the loop(s).

Referring again to midline attachment point 1810, in an implementation, a breakaway connection may be included.

Belt 1802 may include an overlay 1812 which may be constructed of a durable material. Overlay 1812 may be ¾ of an inch in one implementation or a different width in other implementations. Overlay 1812 may be stitched in place and secured via rivets 1813 to allow connecting members to securely fasten onto attachment points. In one implementation overlay 1812 may be one continuous piece of material. In another implementation, overlay 1812 may be constructed of multiple segments. As depicted, overlay 1812 may be stitched onto (or otherwise affixed to) surface area 1804 of belt 1802. Similar to the depiction in FIG. 14C, a gap 1815 in between stitching may be used as a pocket to house or attach accessories (e.g., food bags, animal clickers, mobile phone cases, toys, animal treats, etc.). In another implementation, other patterns of stitching may be used.

Movement controlling device 1818, as depicted, includes three segments: a rear right segment 1820, a rear left segment 1824, and a center segment 1836.

As depicted, rear right segment 1820 includes a connecting member 1822 which may connect to inner-right hip attachment point 1808 of belt 1802. In another implementation (not depicted) connecting member 1822 may connect to outer-right hip attachment point 1809 of belt 1802. The user may choose an appropriate attachment point to secure movement controlling device 1818 based on the size of the animal, the comfort of the user (i.e., based on the user's waist size), or other reasons.

In an implementation, rear right segment 1820 may be any length and the length may be adjustable. In another implementation, rear right segment 1820 may be of some length that may allow rear right segment 1820 to descend from a user's right hip, behind the user along his/her buttocks, until it joins with rear left segment 1824.

Rear left segment 1824 may be of equal or different length than that of rear right segment 1120. In the depicted implementation, lengths of rear left segment 1824 and rear right segment 1820 are substantially similar. Rear left segment 1824, via a connecting member 1826, may join to inner-left hip attachment point 1806 of hip belt 1802 at one end. In another implementation (not depicted) connecting member 1826 may connect to outer-left hip attachment point 1807 of belt 1802. The user may choose an appropriate attachment point to secure movement controlling device 1818 based on the size of the animal, the comfort of the user (i.e., based on the user's waist size), or other reasons.

Rear left segment 1824, may descend from the left hip of a user, behind the user along the buttocks, until it joins with rear right segment 1820.

Center segment 1836 may join to rear right segment 1820 and rear left segment 1824, via a joining member 1830. Center segment 1836 may descend in a downward direction (as depicted) and toward an animal along the backside of a user's legs. Center segment 1836 may be of a certain length. Center segment 1836 may include a connecting member 1832. Connecting member 1832 may join center segment 1836 to an animal collar 134. Animal collar 134 may include buckle, prong, choke, etc. to which connecting member 1832 attaches. Animal collar 134 may be a neck collar, head collar, body harness, or other collar that may attach to an animal. In an implementation, movement controlling device 1818 further includes a fourth segment 1864.

Center segment 1836 may be a single continuous segment, as depicted, or center segment 1836 may include two or more segments which may be permanently affixed or removably attached to one another. In an implementation where two segments connect to create a center segment (not depicted), a first portion of the center segment and a second portion of the center segment may connect together via adjustable length segment 1850.

Adjustable length segment 1850 includes a portion 1840 of center segment 1836 that loops through connecting member 1832. An inset provides a detailed view of the frontside 1862 and backside 1860 of adjustable length segment 1850. Adjustable length segment 1850 may be adjusted, via portion 1840, based on a size and/or height of dog. In another implementation, adjustable length segment 1850 may also be adjusted based on the size and/or height of the user wearing belt 1802. To make an adjustment, portion 1840 may be tightened or loosened around connecting member 1832.

Center segment 1836 connects movement controlling device 1818 to animal collar 134, via connecting member 1832. Center segment 1836 ascends upward (as depicted) and a connecting member 1838 may connect with midline attachment point 1810.

Rear right segment 1820, rear left segment 1824, and center segment 1836 may vary in length. In an implementation, the lengths of each of rear right segment 1820, rear left segment 1824, and center segment 1836 may allow control or restriction of an animal connected thereto via animal collar 134 within a heeling zone (as described above with respect to FIG. 5).

As described above, animal training system 1800 includes movement controlling device 1818 and wearable device 1802. Movement controlling device 1818 includes center segment 1836 (a first segment) and rear right segment 1820 (a second segment). Center segment 1836 is coupled to connecting member 1838 (a first connecting member). Rear right segment 1820 is coupled to connecting member 1822 (a second connecting member).

Wearable device 1802 includes midline attachment point 1810 (a first attachment point) and inner-right hip attachment point 1808 (a second attachment point), as depicted. Midline attachment point 1810 is located approximately at a midline position of wearable device 1802. Center segment 1836 is configured to detachably couple to midline attachment point 1810 via connecting member 1838. In an implementation, center segment 1836 may couple snuggly (i.e., as close as possible) via connecting member 1838 to midline attachment point 1810. Rear right segment 1820 is configured to detachably couple to inner-right hip attachment point 1808 via connecting member 1822. Similar to the depictions in FIGS. 1 and 2, rear right segment 1820 in FIG. 18 may be located at an opposing hip position of wearable device 1802 in relation to an animal.

In other implementations not depicted, rear right segment 1820 is configured to detachably couple to outer-right hip attachment point 1809 via connecting member 1822.

In an implementation, movement controlling device 1818 further includes rear left segment 1824 (a third segment). In the depicted implementation, center segment 1836 is constructed of a continuous piece of material. In other implementations (not depicted), center segment 1836 may be constructed of two or more pieces of material that are joined together. Rear left segment 1824, located at the proximal hip position of the wearable device in relation to an animal, includes connecting member 1826 (a third connecting member). Rear right segment 1820 and rear left segment 1824 are connected to center segment 1836 via joining member 1830. Animal collar 134 is connectable to animal training system 1800.

In the depicted implementation, wearable device 1802 includes rear left segment 1824 that is configured to detachably couple to inner-left hip attachment point 1806 (a third attachment point) via connecting member 1826.

In other implementations not depicted, rear left segment 1824 is configured to detachably couple to outer-left hip attachment point 1807 via connecting member 1826.

In an implementation, inner-right hip attachment point 1808 and outer-right hip attachment point 1809 and are located on a right side of wearable device 102 (which may be worn at a user's hip), and inner-left hip attachment point 1806 and outer-left hip attachment point 1807 are located on a left side of wearable device 1802. Inner-right hip attachment point 1808 and outer-right hip attachment point 1809 and are located on opposing sides of inner-left hip attachment point 1806 and outer-left hip attachment point 1807.

In an implementation, one or more of the connecting members 1838, 1832, 1822, or 1826 include one or more of the following: a male or female buckle, snap hook, quick link, eye bolt, swivel hook, bolt snap, or carabiner clip.

In an implementation, wearable device 1802 is a hip belt, a waist belt, a vest, a jacket, or other device capable of being worn on a user.

In an implementation, midline attachment point 1810 includes a breakaway attachment point.

Movement controlling device 1818 includes center segment 1836, rear right segment 1820, and rear left segment 1824. Center segment 1836 is configured to couple to midline attachment point 1810 located at wearable device 1802 via connecting member 1838. Midline attachment point 1810 is located approximately at a midline position of wearable device 1802. Rear right segment 1820 is configured to couple to inner-right hip attachment point 1808 and outer-right hip attachment point 1809 located at wearable device 1802 via connecting member 1822. Rear left segment 1824 is configured to couple to inner-left hip attachment point 1806 and outer-left hip attachment point 1807 located at wearable device 1802 via connecting member 1826. Center segment 1836 is configured to couple movement controlling device 1818 to an animal.

In an implementation, center segment 1836 is configured to couple movement controlling device 1818 to an animal via one or more of a neck collar, a head collar, a harness, or an attachment point on a device that is capable of being worn by the animal.

In an implementation, movement controlling device 1818 may further include a handle affixed to one of rear right segment 1820, rear left segment 1824, or center segment 1836.

One or more of rear right segment 1820, rear left segment 1824, or center segment 1836 may include a shock absorption mechanism. In the depicted implementation, center segment 1836 includes shock absorption material or mechanism 1842 which may be provided at some point along center segment 1836. In other implementations, a shock absorption material or mechanism may be included in any part of or the entirety of rear right segment 1820, rear left segment 1824, and center segment 1836.

FIG. 19 illustrates a portion 1900 of movement controlling device 1818, having an adjustable length segment 1850, when detached from animal training system 1800. Center segment 1836 is depicted as extended to a straight leash line when connecting member 1838 is disengaged from belt 1802.

In some implementations, the animal training system described in the above may include a lighting system and/or reflective, glow-in-the-dark, and/or other distinctive material(s) which may allow the animal training system to stand out or be easily viewable. For example, any one or more parts of the animal training system may include attached (affixed or removable) lights which may be used to provide lighting which may be useful when walking an animal in the dark.

Animal training systems 1500 and 1800 in FIGS. 15 and 18, respectively, can be worn by a user and connected to an animal to control the animal's movement and may contain similar features as animal training system 100 in FIG. 1. Furthermore, features depicted in any one of animal training systems 100, 100, 1500 and 1800 may be used in any other of animal training systems 100, 1500 and 1800. Although FIGS. 3-6 illustrate animal training system 100 in use, animal training systems 1500 and 1800 may be similarly used as depicted by FIGS. 3-6.

Although the figures and description provide a wearable device that may be worn at a user's hips, waist, chest, etc., in other implementations, the movement device may be modified or reconfigured based on the height of the dog in relation to the length of the user's out seam, in order to maintain the leverage points and heeling zone of the animal training system. For example, if a user's height and/or an animal's height is closer to the ground, the position or length of the movement controlling device may be adjusted. Alternatively, the segments and attachment points may be re-positioned or may connect to additional body parts (e.g., upper leg, lower leg, etc.).

Although the present animal training system for achieving heeling behavior includes a hip belt as the wearable device, alternative implementations can include a waist belt, vest, jacket, harness or other wearable apparatus that provides at least one front midline attachment point combined with at least two side hip attachment points.

FIG. 20 is a flowchart of a method 2000 of utilizing an animal training system to control movement of an animal. In describing the method 2000, reference is made to FIGS. 5 and 15 to illustrate an implementation, however, the animal training system(s) depicted in any of FIGS. 1, 2, and 5, and/or 18 may be used (either alone or in any combination with each other and/or with FIG. 15) by method 200. It is noted that the examples provided in FIGS. 1, 2, and 5, 15, and/or 18 is meant for illustrative purposes, and is not to be considered a limiting implementation. In other implementations, any animal training system(s) and/or movement controlling device(s) described in this disclosure and/or figures may instead be used to carry out method 2000.

Referring again to FIG. 20, method 2000 starts at block 2002 where a first segment of a movement controlling device is secured to a first attachment point located approximately at a midline position of a wearable device. In FIG. 15, front segment 1136 (a first segment) of movement controlling device 1118 is secured to midline attachment point 1110 (a first attachment point) located midline position of belt at a midline position of wearable device 1102. As described above, wearable device 1102 may be a hip belt, a waist belt, a vest, a jacket, a belt connected to a calf harness, etc.

Referring again to FIG. 20, at block 2004, a second segment of the movement controlling device is secured to a second attachment point located at the wearable device. In FIG. 15, rear right segment 1120 (a second segment) of movement controlling device 1118 is secured to right hip attachment point 1108 (a second attachment point) located at wearable device 1102.

Referring again to FIG. 20, at block 2006, the wearable device is placed on a user's body. In FIG. 15, wearable device 1102 is placed on user's body (e.g. user 304's body, as depicted in FIG. 5).

Referring again to FIG. 20, at block 2008, in response to connecting the first segment to a collar worn by an animal, movement of the animal is controlled to a heeling zone. In response to connecting the front segment 1136 to animal collar 134 worn by an (e.g., animal 306 in FIG. 5), movement of the animal is controlled to a heeling zone (e.g., heeling zone 502 in FIG. 5).

As described above, heeling zone 502 in FIG. 5 is an area where the proximal shoulder of an animal coupled to the movement controlling device maintains position within a user's arm's length to the front, side, back and rotational position of the user when wearing the animal training system.

Although the animal training system is used for training of a dog, in other implementations, the animal training system may be used to train other types of animals.

In an implementation, rear left segment 1124 (a third segment) of movement controlling device 1118 is secured to left hip attachment point 1106 (a third second attachment point) 1106 located at wearable device 1102.

Although the animal training system described in the above is used to control movement of one animal, in other implementations, the animal training system could control movement of more than one animal tethered thereto. For example, if a user wishes to walk two dogs, one dog may walk on one side next to the user's hip while the second dog may walk on the opposite side next to the user's hip.

For purposes of this disclosure, any element mentioned in the singular also includes the plural.

Features described in any one of the above figures may apply to other figures. Additionally, features described with respect to one component may also apply to another component. For example, features described with respect to belt 102 in FIG. 1 may also be included in and apply to belt 1002 in FIG. 10.

Although the belt may be used on an animal (i.e., a dog), in some implementations, the belt may also be used on a human.

As described above, a midline attachment point is located approximately at a midline position of the belt. The midline attachment point may be exactly located at a midline position of the belt or may be located approximately in the vicinity of the midline position of the belt (i.e., within one or two inches away from the midline position of the belt). In other implementations, the midline attachment point may be located anywhere on the belt.

The improved animal training system described in this disclosure may provide the following benefits. Dogs may learn to heel faster by having maximum opportunity to maintain proximal position to a user's hip. The animal training system may reduce user frustration. The animal training system may provide a minimal amount of leash in-hand which may improve the timing of rewards/corrections by a user. The animal training system may allow the handler to "brace" a reactive dog's sudden movements (e.g., jolts on the leash in response fear, defensiveness or prey drive) at the hip without concern that the dog can break free from the user's grip. The animal training system may prepare a dog for off leash heeling. The animal training system may increase motivation in owners to walk their dog by reducing pulling ahead and crossing in-front by animal. The animal training system may be completely or partially hands-free which allows users to multi-task which walking their animal (e.g., hold hands and/or carry a child, or push a child in a stroller, etc.). An animal in the heeling zone allows walkers and runners to move at high speed without risking the dog tripping the user, and such heeling zone may be achieved by the animal training system. The animal training system may be completely or partially hands-free which may allow for a full range of motion by the user during workout, use of hand-held equipment, use of a mobile phone or other mobile device, etc. The animal training system may allow outside/field work by professional k9 law enforcement/military users before the dog has achieved off-leash heeling behavior and/or during field work whereby the k9 law enforcement/military user can restrict the dog to a heeling position, or another position as required for the service animal, without hand-held leash contact while maintaining two hands on his/her service weapon or weapon systems. This benefit is currently not available to professional k9 law enforcement/military users who must maintain one hand on the leash of their service dog and one hand on their service weapon/weapon systems in instances where leash restraint using traditional leash methods are required.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Reference throughout this specification to "an implementation" or "one implementation" means that a particular feature, structure, or characteristic described in connection with the implementation is included in at least one implementation. Thus, the appearances of the phrase "an implementation" or "one implementation" in various places throughout this specification are not necessarily all referring to the same implementation.

It is to be understood that the above description is intended to be illustrative, and not restrictive. Many other implementations will be apparent to those of skill in the art upon reading and understanding the above description.

What is claimed is:

1. A movement controlling device for controlling an animal, the movement controlling device comprising a first segment, a second segment, a third segment, and a fourth segment, wherein the first segment is coupled to a first connecting member configured to couple to a first attachment point, wherein the second segment is coupled to a second connecting member configured to couple to a second attachment point, wherein the third segment is coupled to a third connecting member configured to couple to a third attachment point, wherein the second segment and the third segment are configured to couple to the fourth segment, via a joining member;

wherein at least one of the first segment, the second segment, or the third segment comprises a connecting member, the connecting member configured to removably couple to an attachment point on a wearable device within a bounded travel region, the bounded travel region being positioned between a plurality of securing structures positioned on the wearable device at discrete locations, and wherein the connecting member, in response to being coupled to the attachment point, is slidable within the bounded travel region.

2. The movement controlling device for controlling an animal of claim 1, wherein at least one of the first attachment point, the second attachment point, or the third attachment point is decoupled from the wearable device.

3. The movement controlling device for controlling an animal of claim 1, wherein at least one of the first segment, the second segment, and the third segment comprises a shock absorption mechanism.

4. The movement controlling device for controlling an animal of claim 1, wherein a length of the second segment may fixed or adjustable.

5. The movement controlling device for controlling an animal of claim 1, wherein the first segment couples to the fourth segment via a fourth connecting member, wherein a length of a portion of the first segment is adjustable.

6. The movement controlling device for controlling an animal of claim 1, further comprising a handle affixed to one of the first segment, the second segment, or the third segment.

7. The movement controlling device for controlling an animal of claim 1, wherein each of the first segment, the second segment, the third segment, and the fourth segment are separated from each other.

8. The movement controlling device for controlling an animal of claim 7, wherein the joining member separates the second segment, the third segment, and the fourth segment.

9. The movement controlling device for controlling an animal of claim 1, wherein the second segment and the third segment are coupled via the joining member at a supplementary angle, and wherein one of the second segment or the third segment are coupled to the fourth segment via the joining member at a complimentary angle.

10. The movement controlling device for controlling an animal of claim 1, wherein at least one of the first connecting member, the second connecting member, or the third connecting member comprises at least one of: a male or female buckle, snap hook, quick link, eye bolt, swivel hook, bolt snap, or carabiner clip.

11. The movement controlling device for controlling an animal of claim 1, wherein the joining member comprises a ring or an eye swivel.

12. The movement controlling device for controlling an animal of claim 1, wherein the plurality of securing structures comprise at least one of a rivet, an adhesive bond, a weld, a clip, or a mechanical fastener.

13. The movement controlling device for controlling an animal of claim 1, wherein, in response to the connecting member being coupled to the attachment point, the plurality of securing structures define a discrete travel path for the connecting member coupled to the attachment point to be constrained within the bounded travel region.

14. The movement controlling device for controlling an animal of claim 13, wherein movement of the connecting member coupled to the attachment point along the discrete travel path repositions one of the first segment, the second segment, or the third segment independently of movement of other remaining segments.

15. The movement controlling device for controlling an animal of claim 1, wherein at least one of the first segment, the second segment, or the third segment comprises a strap comprising a fixed-length.

16. The movement controlling device for controlling an animal of claim 1, wherein the wearable device comprises a strap and an overlay affixed at discrete locations such that the overlay, the strap, and the plurality of securing structures define the bounded travel region.

17. The movement controlling device for controlling an animal of claim 16, wherein the plurality of securing structures are affixed within the overlay and the strap and define opposing ends of the bounded travel region.

18. The movement controlling device for controlling an animal of claim 1, wherein at least one of the first segment, the second segment, the third segment, or the fourth segment is removably attachable to the wearable device at a plurality of locations, each of the plurality of locations comprising a corresponding attachment point.

\* \* \* \* \*